United States Patent

Reiley et al.

[15] 3,693,165

[45] Sept. 19, 1972

[54] PARALLEL ADDRESSING OF A STORAGE HIERARCHY IN A DATA PROCESSING SYSTEM USING VIRTUAL ADDRESSING

[72] Inventors: Forrest A. Reiley; James T. Richcreek, both of Hyde Park, N.Y.

[73] Assignee: International Business Machines Corporation, Armonk, N.Y.

[22] Filed: June 29, 1971

[21] Appl. No.: 157,918

[52] U.S. Cl. ................................................340/172.5
[51] Int. Cl. ...........................G11c 9/00, G06f 13/00
[58] Field of Search ....................................340/172.5

[56] References Cited

UNITED STATES PATENTS

| | | | |
|---|---|---|---|
| 3,569,938 | 3/1971 | Eden et al. | 340/172.5 |
| 3,470,540 | 9/1969 | Levy | 340/172.5 |
| 3,401,376 | 9/1968 | Barnes et al. | 340/172.5 |

*Primary Examiner*—Gareth D. Shaw
*Attorney*—Edwin Lester et al.

[57] ABSTRACT

A data processing system includes a central processing unit which uses virtual addressing in address control words to access a high speed buffer store of limited storage capacity and simultaneously to access a high capacity main store of slower operating speed, whereby no time is lost in accessing the main store in the event the buffer store cannot be accessed. If the buffer store can be accessed, then a sector address register and a particular associative register in an array must compare with address control information in the address control word. Each sector address register has a link register the content of which identifies the particular associative register which must compare simultaneously with the address control information. Any sector address register may be linked to any associative register in the array by changing the content of the associated link register accordingly. Thus information from any part of the main store may be stored in any part of the buffer store by using this virtual addressing arrangement.

20 Claims, 24 Drawing Figures

INVENTORS
FORREST A. REILEY
JAMES T. RICHCREEK

BY Thomas & Thomas
ATTORNEYS

PARALLEL ADDRESSING OF A STORAGE HIERARCHY IN A DATA PROCESSING SYSTEM USING VIRTUAL ADDRESSING

CROSS REFERENCE TO RELATED APPLICATIONS

U.S. Pat. application Ser. No. 678,152, now U.S. Pat. No. 3,533,075, filed on Oct. 19, 1967 for Dynamic Address Translation Unit With Look-Ahead by Ellsworth L. Johnson et al.

BACKGROUND OF THE INVENTION

This invention relates to data processing systems and more particularly to such systems wherein a central processing unit employs virtual addressing in address control words to access a buffer store and a main store.

Some types of data processing systems utilize virtual addressing in instruction words of their programs. For purposes of virtual addressing an imaginary memory device may be presumed the storage capacity of which is capable of holding a large quantity of data required to be processed in a particular program e.g. all of the data. The number of virtual addresses, may, and often does, exceed the number of addresses in total storage capacity of a given data processing system. If a data processing system which uses virtual addressing includes a central processing unit, a buffer store, a main store, and various input output devices which may communicate with the main store, then some provision must be made to translate the virtual addresses into real addresses for the various stores employed. If an instruction control word is issued by the central processing unit to obtain data from a particular storage device, some arrangement must be made to convert the virtual address of such instruction control word to a real address for the particular storage device. The above-referenced application illustrates one manner in which virtual addresses may be translated to real addresses when access is made to a main store for instance. In many types of data processing systems it is desirable to use a buffer store which has high speed for the purpose of reducing the processing time required to complete a given program by reducing the number of times access must be made to the much slower main store. However, the use of a buffer store in such cases involves the problem of translating the virtual address in each instruction word to a first real address for the buffer store where information is available there or to a second real address for the main store in case the information is not available in the buffer store. It is readily seen that complications arise because data specified by a virtual address in an instruction word has one real address in the main store and a different real address in the buffer store. One simple solution is to provide one data address translation unit for the buffer store and a second data address translation unit for the main store plus the necessary supervisory programs, but the resultant increase in equipment tends toward a prohibitive cost factor. It is to the problem of providing an economically feasible addressing arrangement which responds to virtual addresses in instruction words from a central processing unit and obtains the specified data first from a buffer store, if available, or second from a main store.

SUMMARY OF THE INVENTION

It is a feature of this invention to provide an improved arrangement for utilizing virtual addressing to access a buffer store if data is available and a main store if data is not available in the buffer store.

It is a feature of this invention to provide an improved addressing arrangement for economically utilizing virtual addressing to access a buffer store and a main store simultaneously to obtain specified data in the shortest possible time thereby to increase the speed of processing.

It so happens in processing data that a small percentage of the data in a store during a given time segment is used or modified at a much higher rate or frequency than the remaining data in the store, thereby giving rise to the expression "20 percent of the storage capacity contains eighty percent of the data." The principle is sound, but the percentages may not be accurate. Data having a high frequency of use during one time interval may have a relatively low frequency of use in a subsequent time interval. In some situations the task of identifying the high value information is not a simple one, or it would be an easy task to match the information hierarchy with a storage hierarchy so that the vast majority of accesses in a data processing system are made to the fastest storage in the system.

In this connection it is pointed out that factors which contribute to improved performance of a data processing system having a memory hierarchy include (1) increased useful bandwidth of the main store, (2) prefetching of future valuable information, and (3) reuse of information contained in the buffer store. It is assumed that the buffer store is a high speed store with low storage capacity and the main store is a high capacity store with a relatively lower speed by comparison. When a block of information, such as a plurality of bytes or words, is transferred from the main store to the buffer store, the bandwidth of the main store is more efficiently used that when either a single byte or a single word is transferred at a time. It is assumed that in a block transfer the requested byte or word is included in the block. It turns out in practice that if one byte or word in a block is used in one instant, there is a high probability that the other information in the block will be used soon thereafter. If block prefetching is done, it results in the combination of increased useful bandwidth for the main store and the prefetch of future valuable information for the buffer both of which are very desirable. It is important in a storage hierarchy to avoid loss of time in accessing the slower main store whenever access cannot be made to the faster buffer store, and for this reason it is important to access both simultaneously when speed of operation is important. Once the buffer store is filled with data and the central processing unit makes a request for data not available in the buffer store, the problem of data replacement in the buffer store arises. One approach which appears to work well in practice is that of replacing the data in the high speed buffer store which has been used the least during the recent past. Stated otherwise, data which has been used recently is preserved in the high speed buffer store while data with the least recent use is replaced.

The foregoing advantages are incorporated in a data processing system according to this invention which includes a central processing unit that utilizes virtual addressing in instructions of a program, a high speed buffer store of limited storage capacity, and a main store of relatively slower speed of operation with a much greater storage capacity than the buffer store. If requested information during a fetch operation is found in the buffer store, it is returned to the central processing unit with a minimal loss of time. Otherwise, access is made by the relatively longer route to the main store in which event a block of information, including the requested information, is transferred to the buffer store. Address control words from the central processing unit are supplied to an associative array which includes a plurality of registers each of which has a virtual address portion and a main store real address portion. The virtual address portion of each address control word from the central processing unit is compared with the virtual address portion of each register in the associative array to determine which given register in the associative array has the same virtual address. When a comparison is found in a given register of the associative array, the real address portion of such register is gated to the main store data whenever access cannot be made to the buffer store. A plurality of sector address registers and a plurality of link registers are provided, and they are arranged in pairs with a given link register associated with a particular sector address register. Each link register may be filled with information which identifies any particular one of the registers in the associative array whereby any sector address register may be linked to any register in the associative array. The sector address in the address control word is compared with the sector address in each sector address register. This compare operation takes place simultaneously with the compare operation in the associative array. Consequently, the cycle of the buffer store is overlapped in time with the cycle of the main store whereby the cycle of the main store is not extended by an unsuccessful effort to access buffer store. If the virtual address in an address control word compares with the virtual address in a particular register of the associative array, if the sector address in the address control word compares with the sector address in a given one of the sector addresses, and if the link register of such given sector address register is linked to and identifies the particular register of the associative array wherein a comparison is found, then access may be made to the buffer store provided valid information is held in the selected sector of the buffer store. Otherwise, access is made to the main store for the requested information without lost time since the two stores are accessed simultaneously until the decision is reached that the requested data is available in the buffer store at which time further access to the main store is inhibited.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
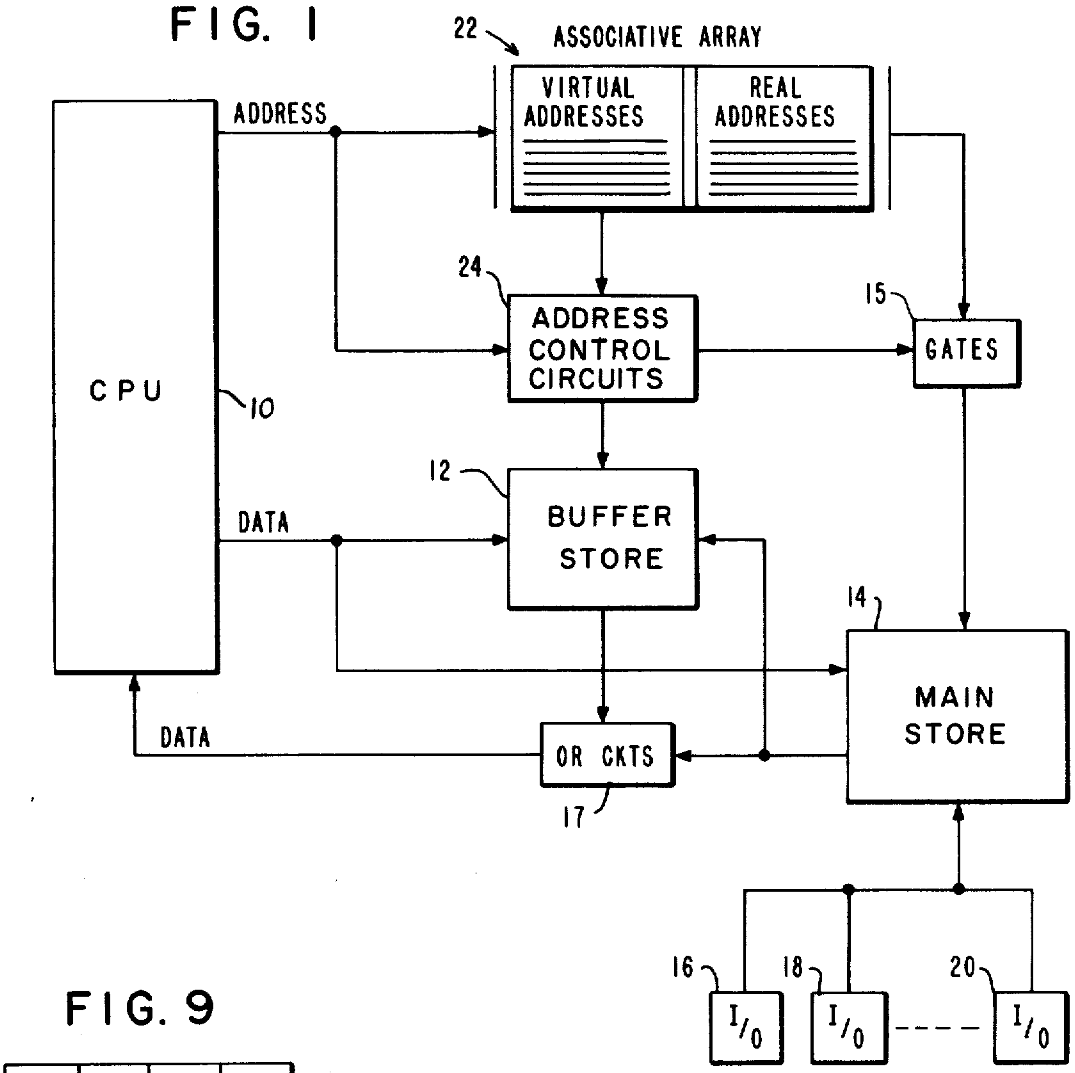
FIG. 1 illustrates in block form a data processing system according to this invention.

Reference is made to FIG. 1 which illustrates a system according to this invention. A central processing unit 10 exchanges data with a high speed buffer store 12 of limited storage capacity and a relatively slower speed main store 14 of much greater storage capacity. A plurality of input-output units 16, 18, and 20 are connected to the main store 14, and they supply information to and receive information from the main store 14. When the central processing unit 10 access the buffer store 12 or the main store 14, it supplies address signals to an associative array 22. The associative array 22 includes a plurality of registers in a stack, and each register has a virtual address portion and a main store real address portion. The virtual address information from the central processing unit is compared with the virtual addresses stored in the associative array 22. If a comparison is found in a given register of the associative array 22, then address control circuits 24 operate to access the buffer store 12 for the purpose of fetching or storing information provided valid information is stored in the selected address of the buffer store 12. If the address control circuits 24 determine that the selected address in the buffer store 12 is not valid, then the main store real address portion of the given register in the associative array 22 is forwarded through a set of gates 15 to the main store for the purpose of accessing the main store 14 to store or fetch information.

The central processing unit 10 uses instructions with operation information and address information. When the operation information specifies a fetch or store operation, the address information determines the storage location where a fetch or store is performed. Each instruction with address information incorporates virtual addressing. The virtual storage or total apparent storage is defined as the total addressing capability of all the programs in the system. The total apparent or virtual apparent or virtual storage may exceed the actual physical storage capacity of the buffer store 12, the main store 14 and the I/O devices 16, 18 and 20.

Figure 2:
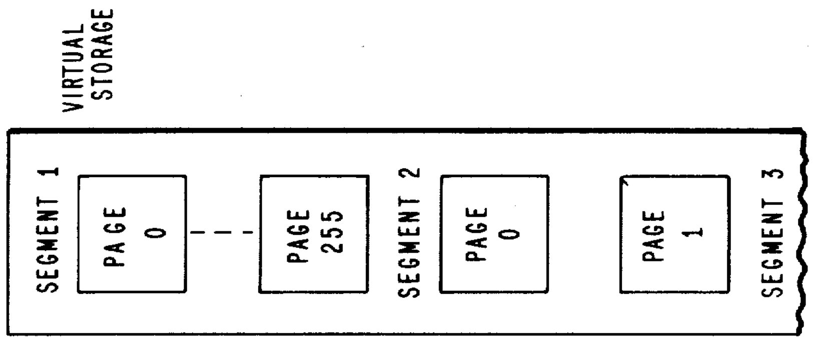
FIGS. 2 through 6 illustrate storage formats utilized in this invention.
Figure 3:
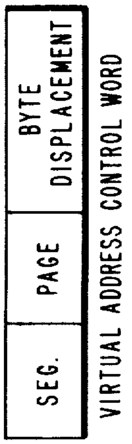

Reference is made next to FIG. 2 which illustrates a format of virtual storage utilized in this invention. It includes an arbitrary designation of storage areas divided into segments which in turn are divided further into pages. The umber of pages per segment may be variable, or the number of pages per segment may be fixed. Segment 1 in FIG. 2 is depicted as included pages 0 through 255. Segment 2, on the other hand, is shown as being composed of pages 0 and 1. Information in the virtual storage of FIG. 2 is addressed by an address control word such as illustrated in FIG. 3. The address control word includes a segment portion, a page portion, and a byte displacement portion. The segment portion specifies the particular segment in the virtual storage to be addressed. The page portion specifies the particular page in the selected segment, and the byte displacement portion specifies the particular byte within the selected page. The byte displacement portion of the address control word in FIG. 3 may be further sub-divided as explained hereinafter.

Figure 4:
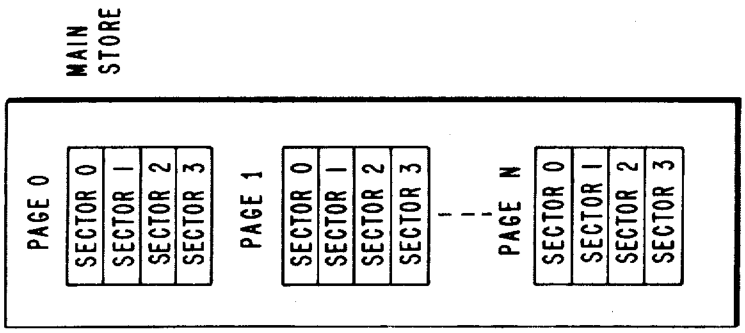
Figure 5:
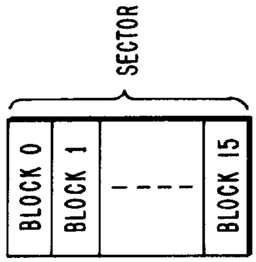
Figure 6:
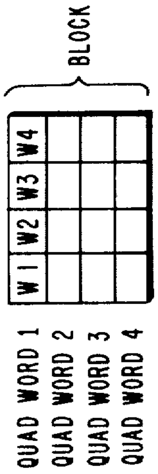

Reference is made next to FIG. 4 which illustrates the format of storing information in the main store 14 in FIG. 1. Information is stored by pages in the main store, and each page is divided into four sectors 0 through 4. Each sector is further subdivided into 16 blocks of information. They are shown as blocks 0 through 15 in FIG. 5. Each block in FIG. 5 is further subdivided into four quad words as illustrated in FIG. 6. There are four quad words per block. Each of the four words in a quad word may be 32 bits in length, and each word may be further subdivided into four bytes of 8 bits each.

Figure 7:
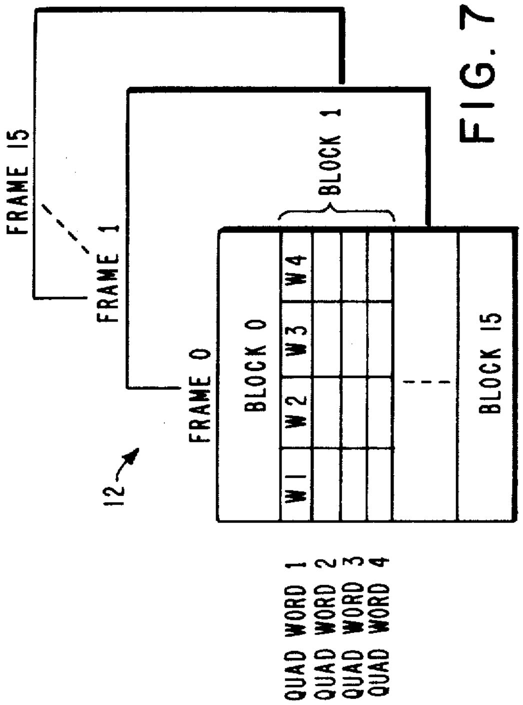
FIG. 7 is a simple schematic of a buffer storage device employed in a processing system according to this invention.

Reference is made next to FIG. 7 which illustrates the storage format in the buffer store 12 in FIG. 1. The buffer store 12 is illustrated with 16 frames, and each frame stores one sector of information from the main store. That is, each frame of the buffer store 12 may store 16 blocks of information.

When information is transferred from the input-output devices 16,18, or 20 in FIG. 1 to the main store 14, the unit of information transferred is the page. When information is transferred from the main store 14 to the buffer store 12, the unit of information transferred is the block.

Figure 8:
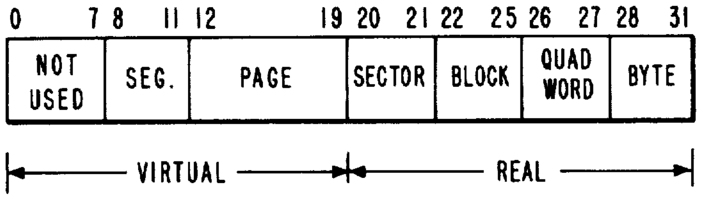
FIG. 8 illustrates an address control word employed in instruction programs according to this invention.

FIG. 8 illustrates an address control word used by the central processing unit 10 to obtain data for processing purposes. The control word is illustrated as 32 32 bits. Bits 0 through 19 specify the segment and page in virtual storage, and bits 20 through 31 specify the byte displacement in virtual storage. However, the byte displacement for the virtual storage is the same as that for the main store 14, and bits 20 through 31 consequently may be termed real address bits. Bits 0 through 7 are not used. Bits 8 through 11 specify a segment such as illustrated in the virtual storage of the FIG. 2. Bits 12 through 19 specify a page within the given segment of the virtual storage FIG. 2. Bits 20 through 31 define the byte displacement within a given page. Byte displacement may be further subdivided into sector, block, quad word, and byte. Bits 20 and 21 select one of four sectors in a page. Bits 22 through 25 select one of sixteen blocks in a sector. Bits 26 and 27 select one of four quad words in a block where word processing is used. Bits 28 through 31 select one of 16 bytes in a quad word where byte processing is used.

Figure 9:
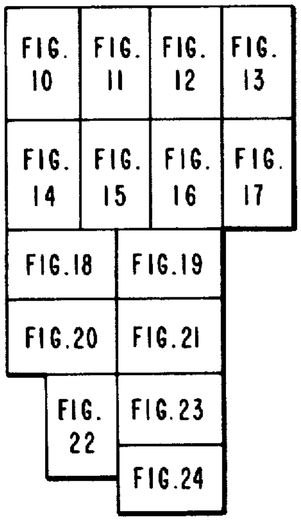
FIGS. 9 through 24 illustrate in greater detail the system shown in block form in FIG. 1 with FIG. 9 indicating the manner in which FIGS. 10 through 24 should be arranged with respect to each other.

The virtual address bits 0 through 19 of an address control word from the central processing unit must be translated from a virtual address to a real address for the main store 14 before data can be accessed in the main store 14. One suitable type of data address translation equipment is shown and described in copending application Ser. No. 678,152 for Dynamic Address Translation Unit With Look-Ahead filed on Oct. 19, 1967 by Ellsworth L. Johnson et al., and such equipment is not illustrated or described herein. Both the virtual address and its translated real address counterpart are stored in registers of the associative array 22 in FIG. 1. It is assumed throughout the remainder of this description that all required data address translations are completed and the real address portions and the virtual address portions are stored beforehand in the associative array 22 in FIG. 1. Each time the central processing unit 10 in FIG. 1 issues a fetch or store instruction, it supplies virtual address bits 8 through 19 of an address control word to the associative array 22 for purposes of this discussion a comparison is found because, under the assumed circumstance noted above, all address translations have been completed earlier. If the information sought in a fetch operation is in the buffer store 12, the address control circuits 24 respond to the virtual address compare operation and the real address bits 20 through 31 of the address control word to obtain the information from the buffer store 12. If the information is not available in the buffer store 12, the real address counterpart of the virtual address is transferred through a set of gates 15 under control of the address control circuits 24, and the real address is supplied to the main store 14 along with bits 20 through 31 of the address control word in FIG. 8. The main store is operated thereby to supply the requested information through the Or circuits 17 to the central processing unit 10. Whenever a selected word is transferred from the main store 14 to the central processing unit 10, it is transferred also to the buffer store 12 and stored. If a selected word is transferred from the main store 14 to the buffer store 12, the entire block which holds the selected word is transferred to and stored in the buffer store 12. This results in increased bandwidth for the main store 14 and prefetch of future valuable information for the buffer store 12 as pointed out above. From this general description of FIG. 1 it is seen how virtual addressing is used by the central processing unit to access the buffer store and the main store. It is appropriate next to consider in more detail the manner in which such access is accomplished. For this purpose reference is made to FIGS. 9 through 24 which illustrate in detail the system shown in block form in FIG. 1. FIG. 9 illustrates the manner in which FIGS. 10 through 24 should be arranged with respect to one another.

Referring first to FIGS. 10 through 13, they illustrate in detail the associative array shown in block form in FIG. 1. The associative array 22 includes a plurality of registers 100 through 103 shown in respective FIGS. 10 through 13. It is assumed for purposes of this discussion that there are sixteen associative registers labelled AR–0 through AR–15. Associative registers AR–3 through AR–14 are omitted in the interest of simplicity. Each one of the associative registers 100 through 103 has a virtual address stored in the left half portion and a main store real address stored in the right half portion. The virtual address in the left half portion of the associative registers 100 through 103 is supplied on associated cables 110 through 113 to corresponding compare circuits 120 through 123. An address register 125 in FIG. 10 receives address signals from the central processing unit 10 whenever information is to be fetched or stored. The address word has 32 bits which are illustrated as bits 0 through 31. Bits 0 through 7 are not used, but they may be employed to expand the magnitude of the segment portion which is represented by the bits 8 through 11. Page selection is represented by bits 12 through 19. Bits 8 through 19 represent a virtual address. Bits 20 through 31 represent a portion of a real address in the main store, and this component of a real address represents byte displacement. The byte displacement bits 22 through 31 for the buffer store 12 are identical to the byte displacement bits 22 through 31 for the main store 14. The byte displacement includes a sector portion represented by bits 20 and 21 in FIG. 10, a block portion represented by the bits 22 through 25, a quad word portion represented by the bits 26 and 27, and a byte portion represented by the bits 28 through 31. The virtual address portion in bits 8 through 19 of the address register 125 is conveyed along the cable 126 to each of the compare circuits 120 through 123 in respective FIGS. 10 through 13. If the virtual address from the register 125 is identical to the virtual address from any one of the associative registers 100 through 103, then the associated one of the compare circuits 120 through 123 provides a positive output signal on a corresponding one of the lines 130 through 133. A negative signal on any one of the lines 130 through 133 indicates the lack of a comparison. It is assumed for purposes of the ensuing discussion that a binary 1 is represented by a positive signal, and a binary zero is represented by a negative signal. Positive logic is assumed. That is, positive signals operate a circuit, and circuits which are operated supply a positive output signal.

The real address portions of the associative registers 100 through 103 represent the real addresses of pages in the main store when the corresponding virtual address has been translated. The real address portions of the registers 100 through 103 are supplied to corresponding sets of gates 150 through 153. The sets of gates 150 through 153 are connected by corresponding cables 160 through 163 to a set of Or circuits 164. The Or circuits 164 supply signals along a cable 165 which are used to address a selected page in the mainstore wherever (1) the central processing unit is storing data, or (2) the central processing unit is fetching data which is not available in the buffer store 12.

The sets of gates 150 through 153 in FIGS. 10 through 13 are operated by associated And circuits 170 through 173. The lines 130 through 133 from the associated compare circuits 120 through 123 are connected to corresponding And circuits 170 through 173. A line 174*a* is connected to each of the And circuits 170 through 173. An Or circuit 175 supplied a positive signal on the line 174*a* (1) whenever requested data in a selected page of the main store is not available in the buffer store or (2) whenever the main store is updated by storing data therein from the CPU 10.

Figure 11:
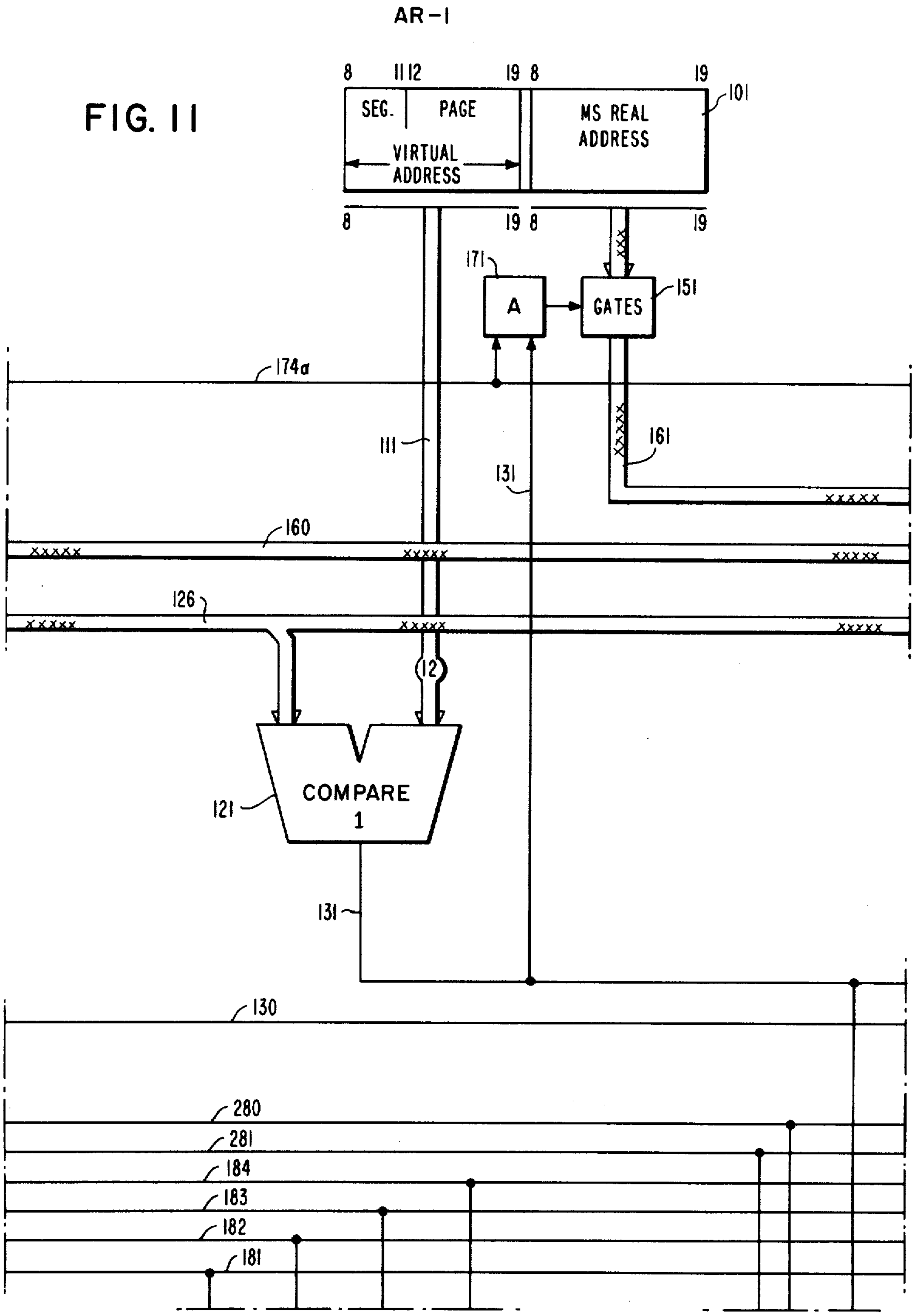
Figure 12:
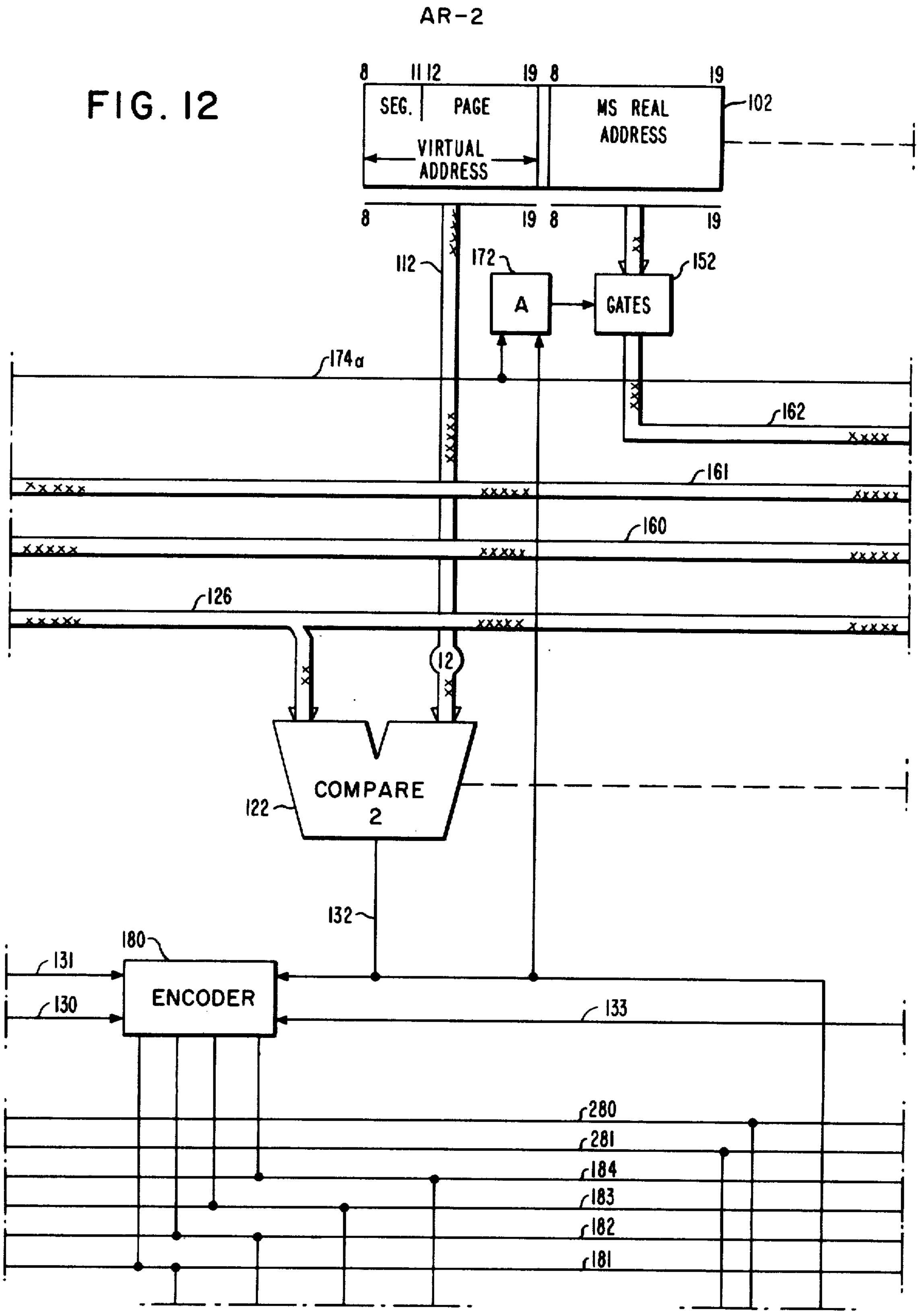
Figure 13:
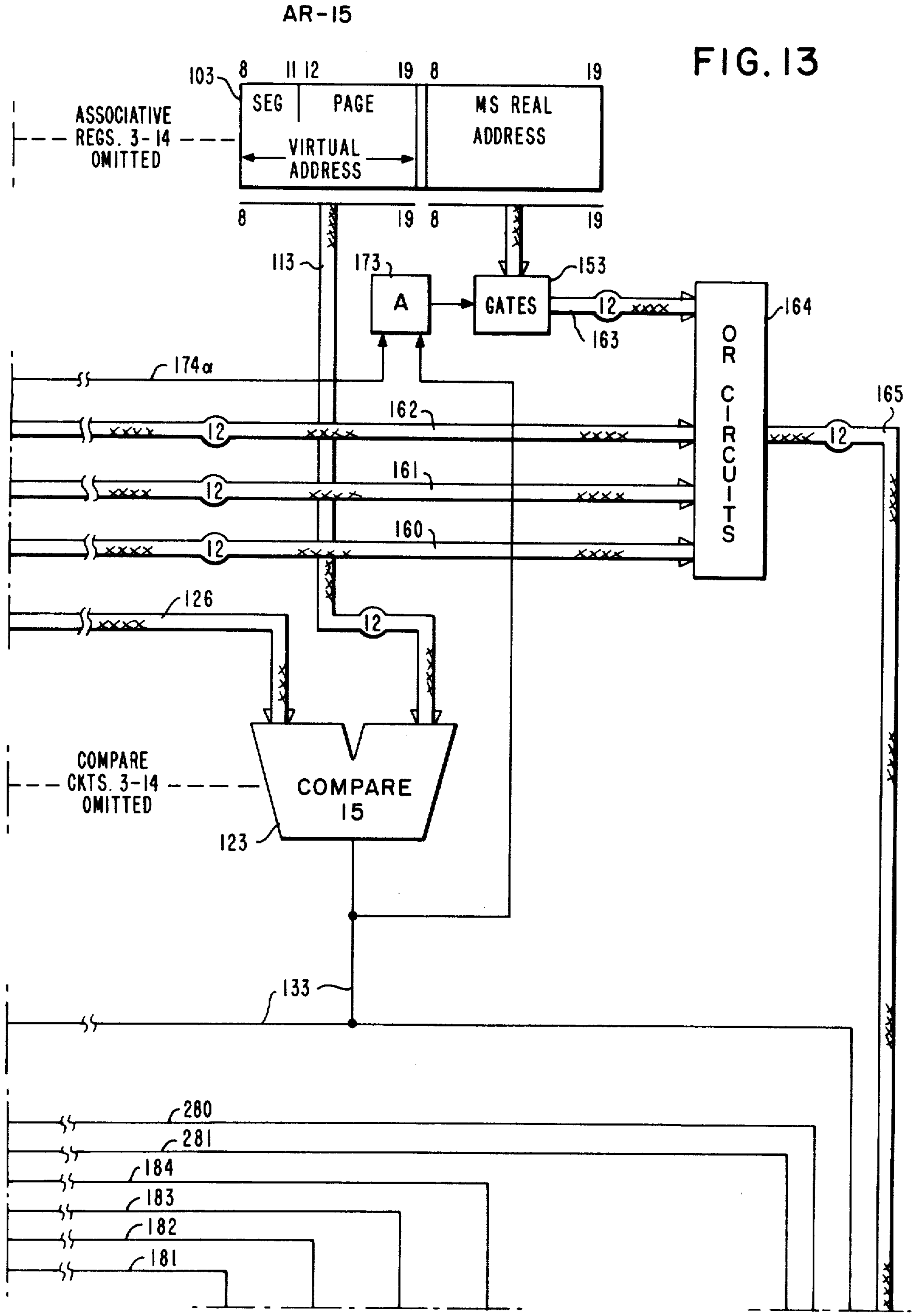

The output lines 130 through 133 of the compare circuits 120 through 123 are connected to an encoder 180 in FIG. 12. One, and only one, of the lines 130 through 133 is positive at any one given time. When any one of the input lines 130 through 133 is positive, a combination of positive and negative output signals are provided on lines 181 through 184 which indicate in binary form the identity of the positively energized input line which in turn represents the identity of the corresponding associative register. For example, if the line 131 in FIG. 11 supplies a positive signal to the encoder 180 in FIG. 12, the combination of signals on the output lines 181 through 184 indicated or specifies associative register AR–a. Table 1 below shows the combination of binary output signals established on the lines 181 through 184 in response to positive signals on each one of the input lines 130 through 133. The associative register specified by each binary combination of output signals also is shown.

TABLE 1

Encoder 180

| Encoder 180 Input Lines | Output Lines 181 | 182 | 183 | 184 | Associative Register Specified |
|---|---|---|---|---|---|
| 130 | 0 | 0 | 0 | 0 | AR–0 |
| 131 | 0 | 0 | 0 | 1 | AR–1 |
| 132 | 0 | 0 | 1 | 0 | AR–2 |
| , | , | , | , | , | , |
| , | , | , | , | , | , |
| , | , | , | , | , | , |
| 133 | 1 | 1 | 1 | 1 | AR–15 |

Signals from the encoder 180 in FIG. 12 on the lines 181 through 184 are supplied to link registers 210 through 213 in FIGS. 14 through 17. There are sixteen link registers which are designated ARL–0 through ARL–15. Link registers ARL–3 through ARL–14 are omitted in the interest of simplicity. Each of the registers ARL–0 through ARL–15 has four bits for storing the identity of the associative register to which it is linked. Each of the registers 220 through 223 is termed a sector address register (SECAR). There are sixteen such registers designated SECAR-0 through SECAR–15. Sector address registers 3 through 14 are omitted in the interest of simplicity. The sector address registers specify the address of a selected sector in the main store 14, and each sector address register is associated with a given frame in the buffer store 12 shown in FIG. 7.

Figure 14:
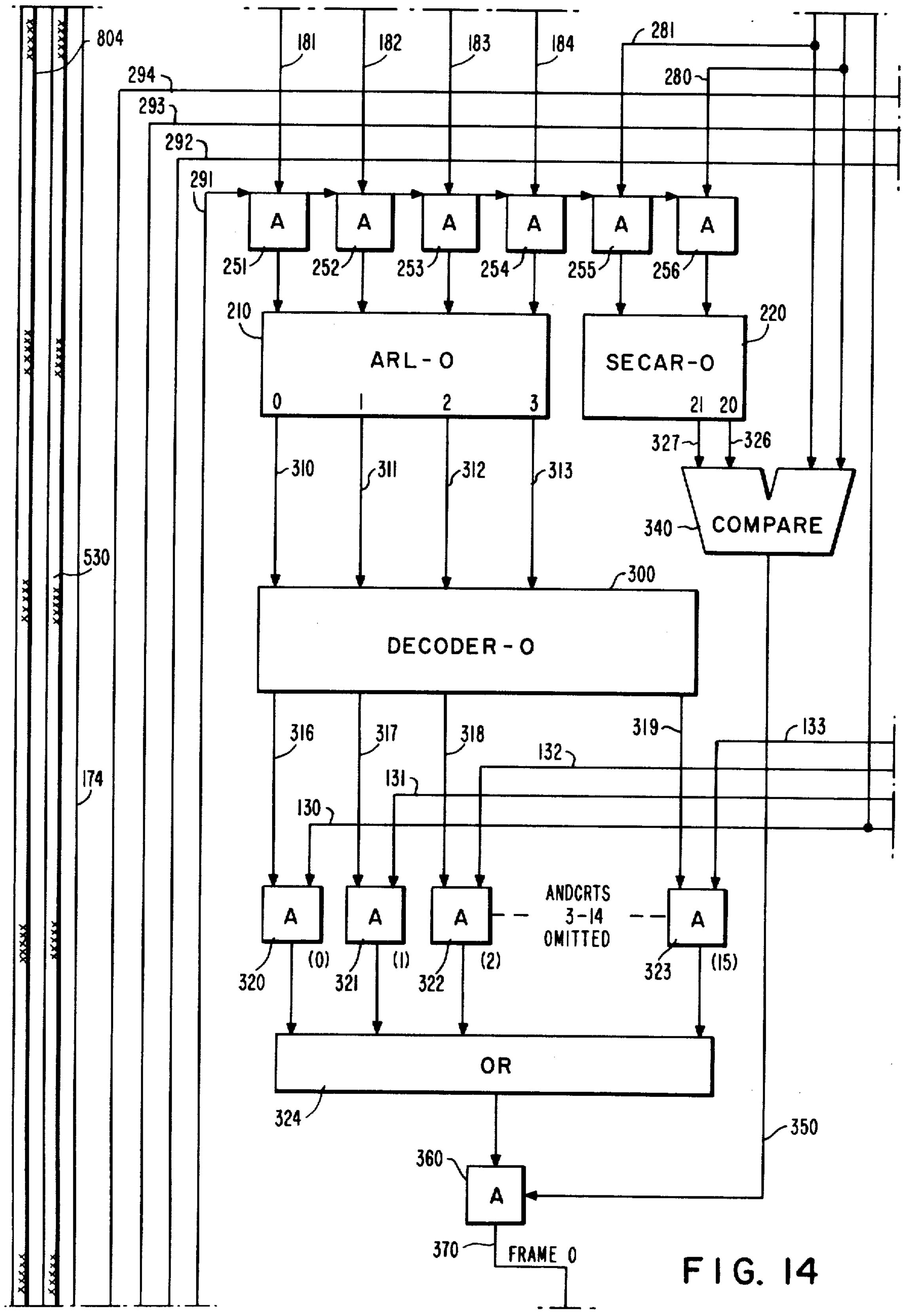
Figure 15:
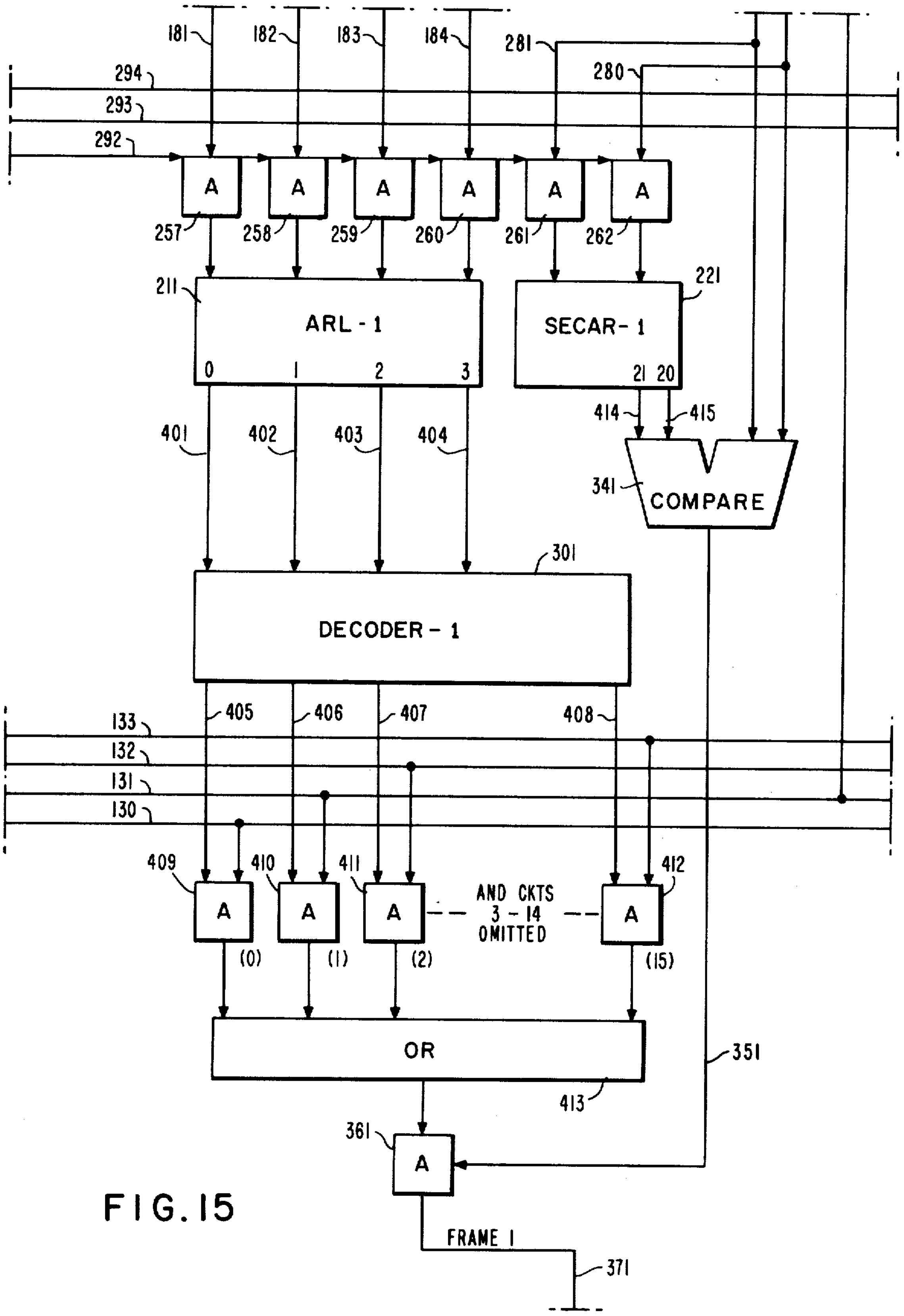
Figure 16:
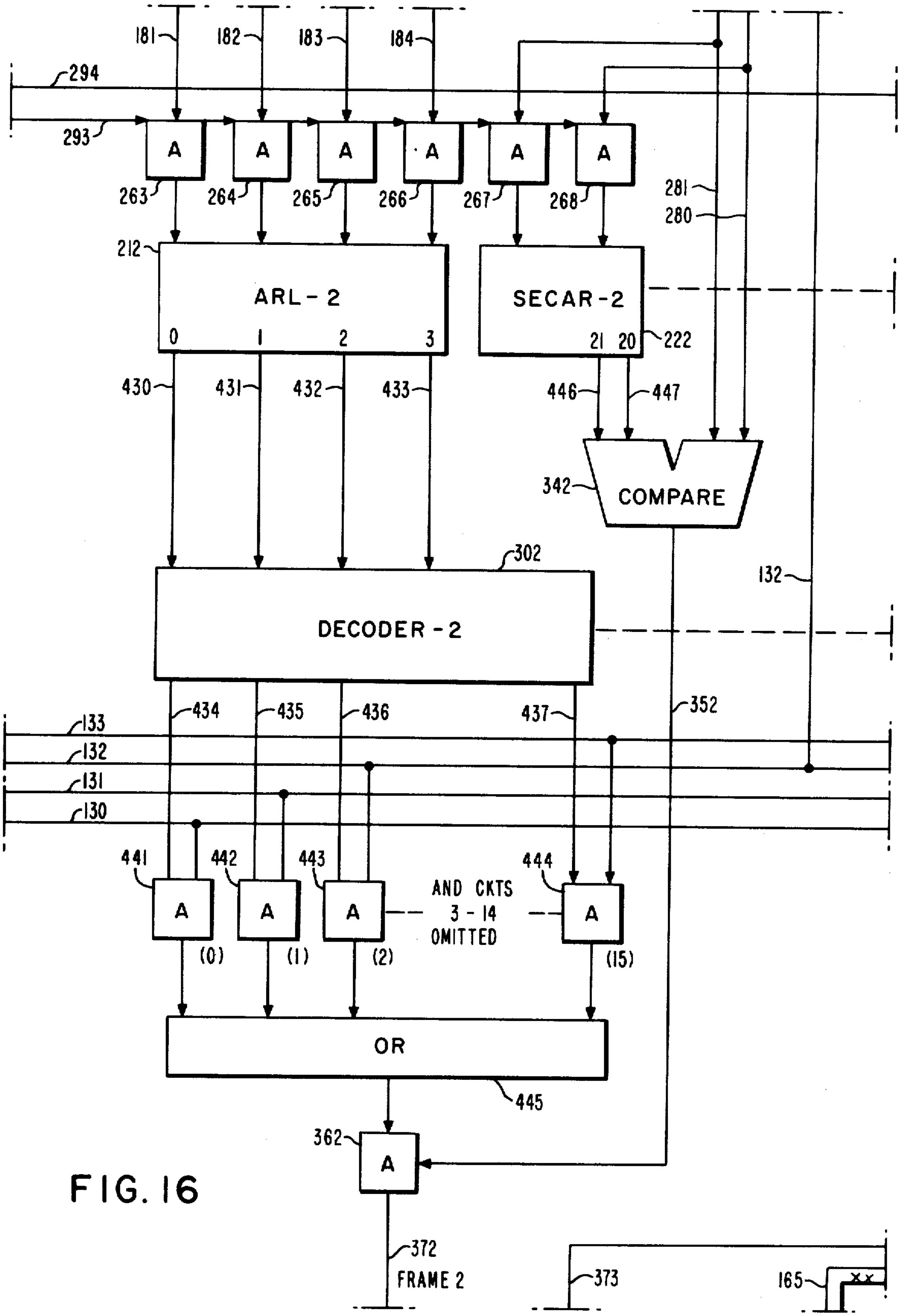
Figure 17:
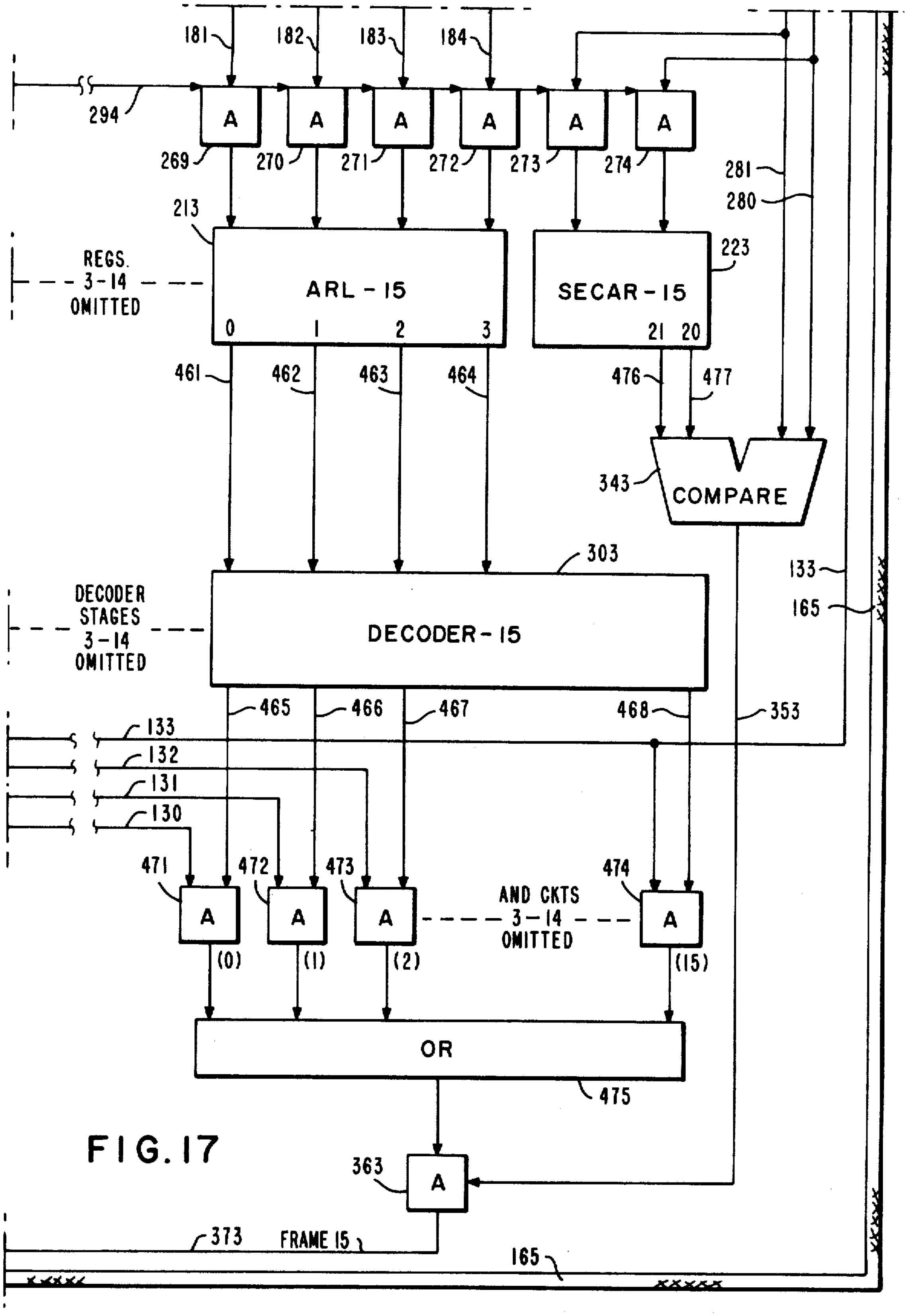

And circuits 251 through 254 are connected to the register 210 in FIG. 14, and And circuits 255 and 256 are connected to the register 220. In FIG. 15 And circuits 257 through 260 are connected to the register 211, and And circuits 261 and 262 are connected to the register 221. In FIG. 16 And circuits 263 through 266 are connected to the register 212, and the And circuits 267 and 268 are connected to the register 222. In FIG. 17 And circuits 269 through 272 are connected to the register 213, and the And circuits 273 and 274 are connected to the register 223.

Figure 10:
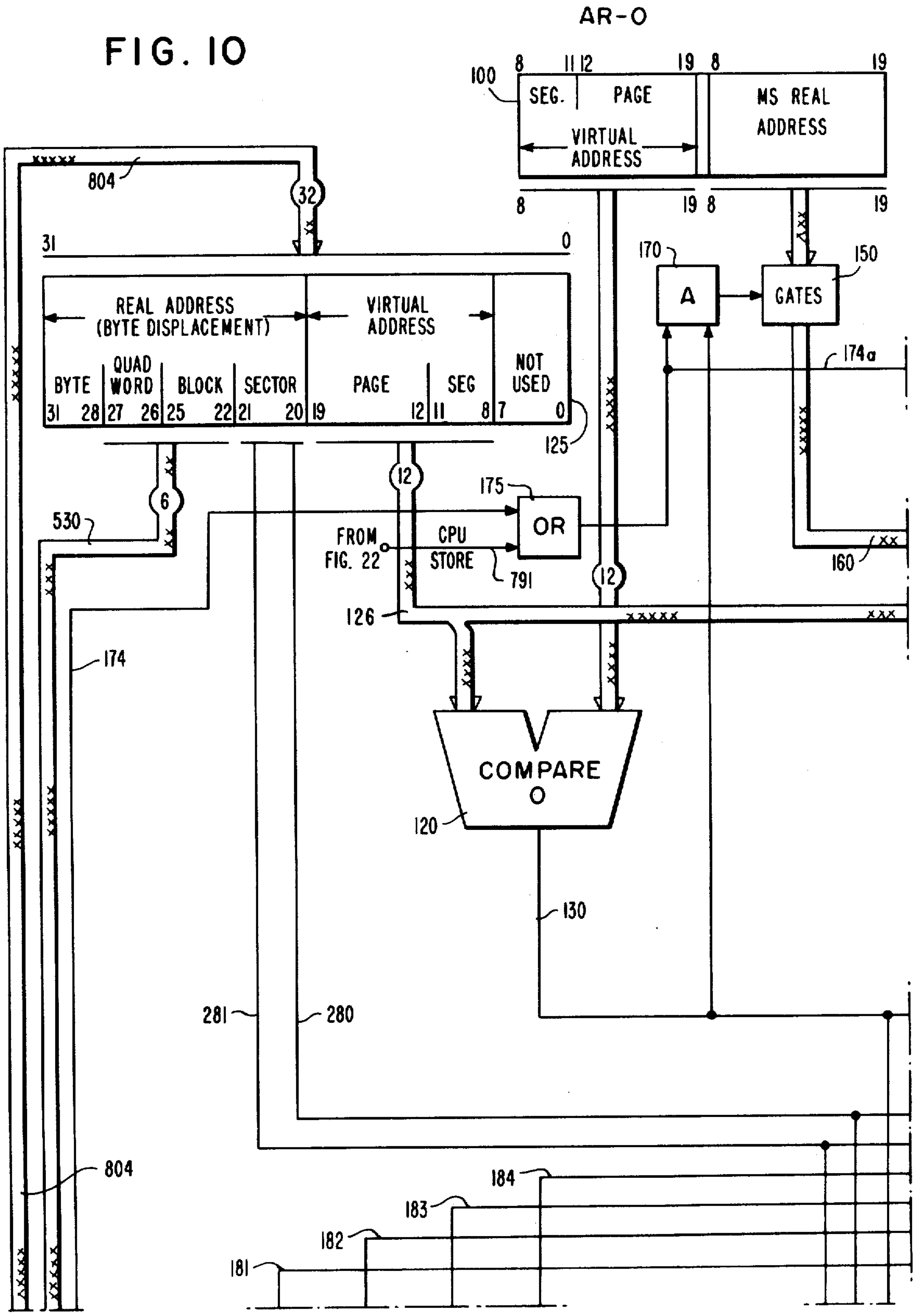

Signals representing bits 20 and 21 from the register 125 in FIG. 10 are supplied on lines 280 and 281 to the And circuits 255 and 256 in FIG. 14, to the And circuits 261 and 262 in FIG. 15, to the And circuits 267 and 268 in FIG. 16, and to the And circuits 273 and 274 in FIG. 17. Information from he encoder 180 in FIG. 12 is supplied on the lines 181 through 184 to the And circuits 251 through 254 in FIG. 13, to the And circuits 257 through 260 in FIG. 15, to the And circuits 263 through 266 in FIG. 16, and to the And circuits 269 through 272 in FIG. 17. In FIG. 14 the And circuits 251 through 256 are operated by a positive signal on a line 291 (1) to pass positive signals on the lines 181 through 184 to the register 210 and (2) to pass positive signals on the lines 280 and 281 to the register 220. The positive signal on the line 291 in essence operates the And circuits 251 through 256 to insert a main store sector address in the register 220 and the link information in the register 210 that identifies the particular associative register in FIGS. 10 through 12 which contains the virtual and real address of the page in main store that contains the sector address specified in the register 220. In like fashion a positive signal on a line 292 in FIG. 15 operates the And circuits 257 through 262 thereby to store link information in the register 211 and the sector address information in the register 221. The positive signal on a line 293 in FIG. 16 operates the And circuits 263 to 268 thereby to store link information in the register 212 and sector address information in the register 222. A positive signal on a line 294 in FIG. 17 operates the And circuits 269 through 274 thereby to store like information in the register 213 and sector address information in the register 223.

Registers 210 through 213 in FIGS. 14 through 17 are connected to respective decoders 300 through 303. Each decoder responds to four input bits and selects one of 16 output lines, and the selected output line is energized with a positive signal. The link register 210 in FIG. 14 stores signal representing four binary bits, and signals representing such binary bits are conveyed on lines 310 through 313 to the input of the decoder 300. The decoder 300 responds to signals on the input lines 310 through 313 to select a given one of its 16 output lines. Only output lines 316 through 319 representing the selection of respective associative registers AR–0, AR–1, AR–2, and AR–15 are shown in the interest of simplicity. These lines are connected to associated And circuits 320 through 323 which in turn are connected to an Or circuit 324. The output of the Or circuit 324 is connected to an And circuit 325.

Signals from the sector address register 220 in FIG. 14 are supplied on lines 326 and 327 to a compare circuit 340. Sector address registers 221 through 223 in FIGS. 15 through 17 are connected in like fashion to corresponding compare circuits 341 through 343. Each one of the compare circuits 340 through 343 has two inputs. One input receives the signals on the lines 280 and 281 from bits 20 and 21 of the address control word in the register 125 in FIG. 10. The second input of the compare circuits 340 through 343 receives two bits of information from the associated sector address registers 220 through 223. When the information supplied to both inputs of any one of the compare circuits 340 through 343 is identical, such compare circuit provides a positive output signal on the corresponding one of the output lines 350 through 353 to an associated one of the And circuits 360 through 363. One of the And circuits 360 through 363 provides a positive output signal on a respective one of the lines 370 through 373 whenever information specified by the data control word in the register 125 in FIG. 10 is held in the buffer store 12 in FIG. 23. If the line 370 is energized with a positive signal, it indicates that the desired address is located in frame 0 of the buffer store 12. In like fashion positive signals on the lines 371 through 373 indicate that the desired address is located in the respective frames 1,2, or 15 of the buffer store 12.

Signals from the link register 211 in FIG. 15 are conveyed on the lines 401 through 404 to the input of the decoder 301. Signals from the decoder 301 are supplied on output lines 405 through 408 to respective And circuits 409 through 412. Output signals from the And circuits 409 through 412 are supplied through an Or circuit 413 to the And circuit 361. Signals from the sector address register 221 in FIG. 15 are supplied on the lines 414 and 415 to the compare circuit 341.

Signals from the link register 212 in FIG. 16 are supplied on lines 430 through 433 to the decoder 302. Signals from the decoder 302 are supplied on output lines 434 through 437 to corresponding And circuits 441 through 444. Signals from the And circuits 441 through 444 are supplied through an Or circuit 445 to the And circuit 362. Signals from the sector address register 222 in FIG. 16 are supplied on lines 446 and 447 to the compare circuit 342.

The link register 213 in FIG. 17 conveys signals on the lines 461 through 464 to the decoder 303, and the decoder 303 in turn supplies signals on output lines 465 through 468 to associated And circuits 471 through 474. The And circuits 471 through 474 are connected through an Or circuit 475 to the And circuit 363. Signals from the sector address register 223 in FIG. 17 are conveyed on lines 476 and 477 to the compare circuit 343.

Figure 18:
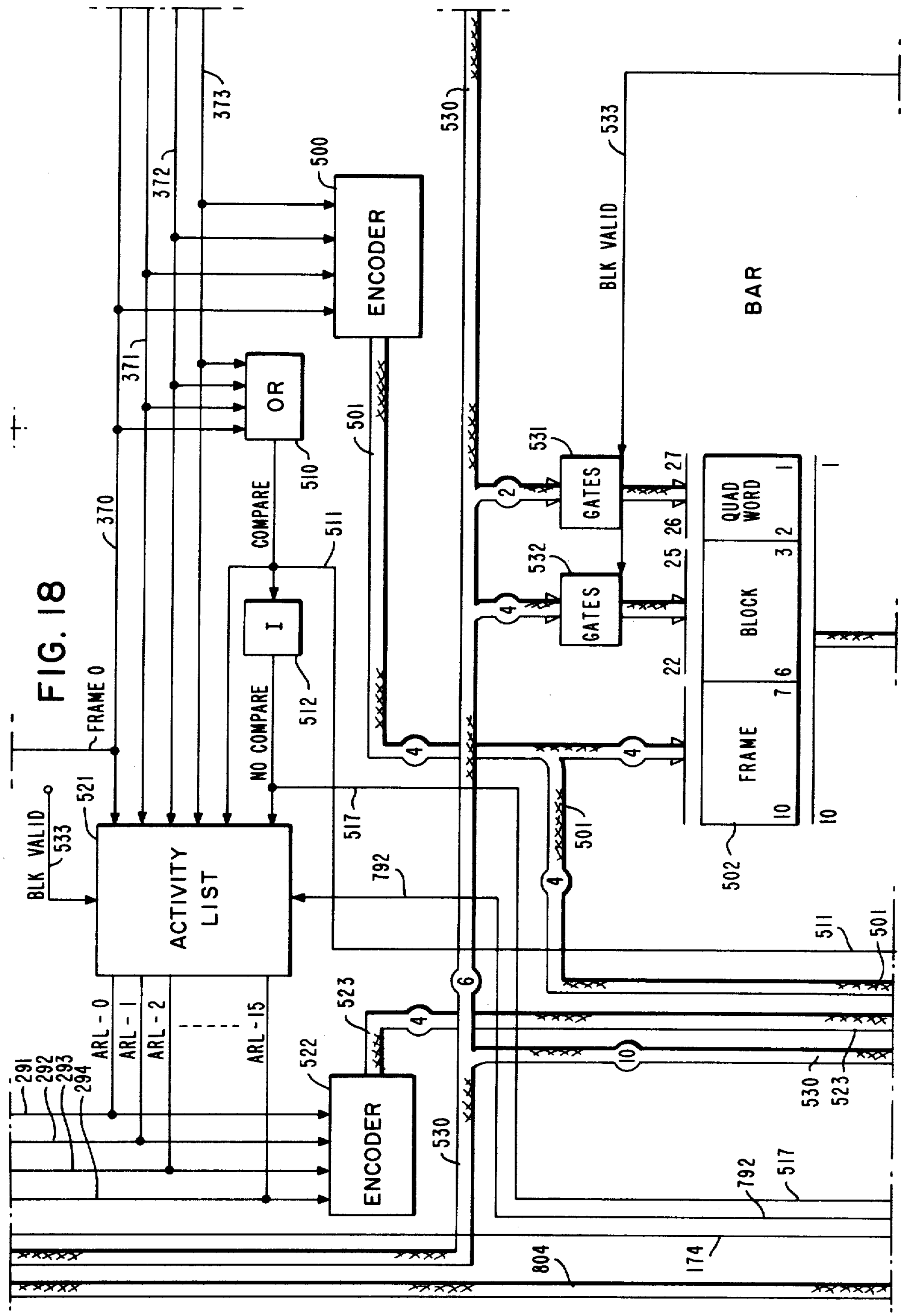

Signals from the And circuits 360 through 363 in FIGS. 14 through 17 are supplied on the output 370 through 373 to an encoder 500 in FIG. 18. One, and only one, of the input lines 370 through 373 is positive at any one given time. When any one of the input lines 370 through 373 is positive, the encoder supplies four output signals representing in binary form the selected one of the frames 0 through 15 of the buffer store 12, and these signals are supplied via a cable 501 to a buffer address register (BAR)502. The four bits of the cable 501 are supplied also through an Or circuit 503 to a duplicate buffer address register (DBAR) 504 in FIG. 20.

Figure 20:
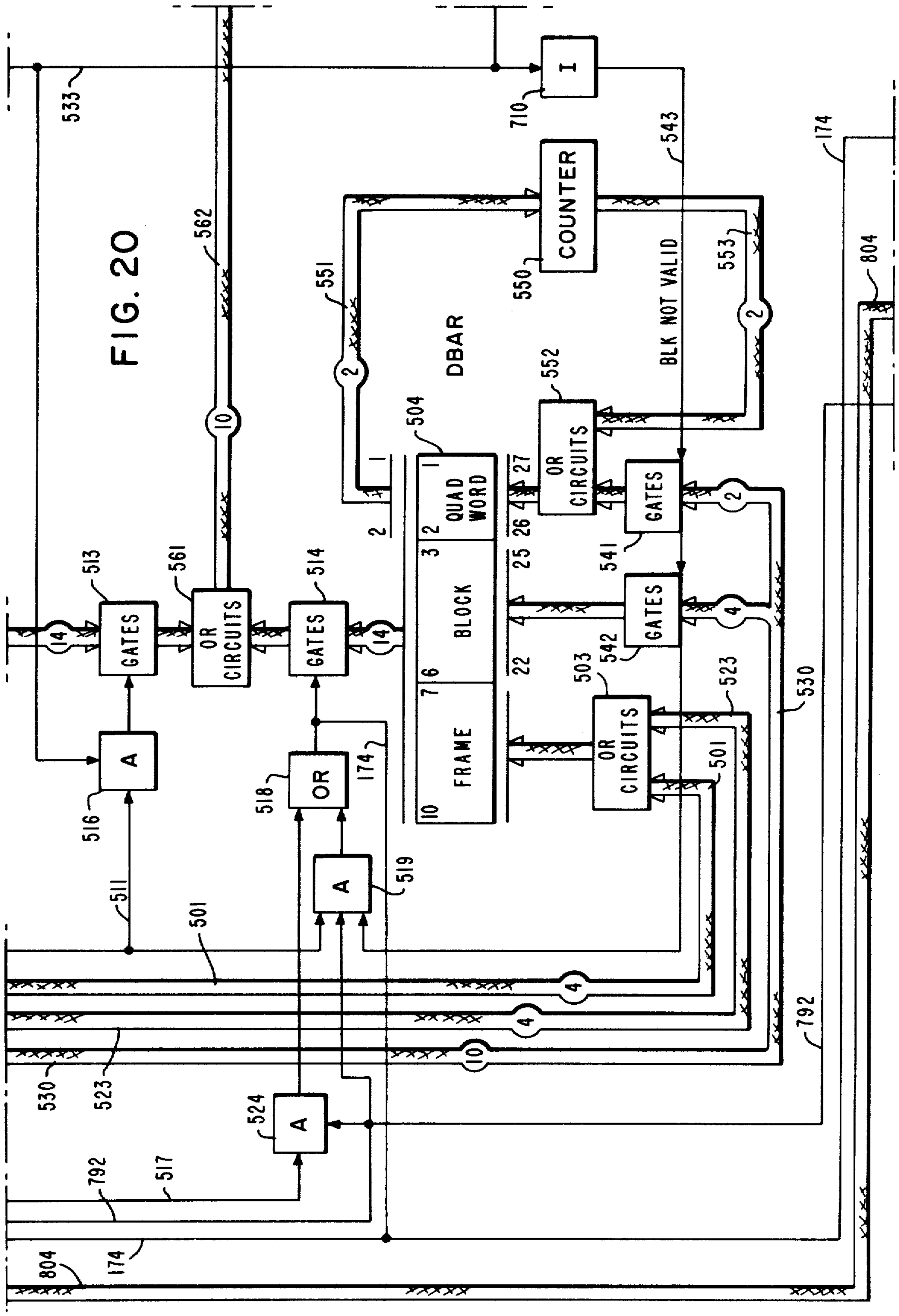

Signals on the lines 370 through 373 in FIG. 18 are supplied also to an Or circuit 510. If any one of these input lines conveys a positive signal to the Or circuit 510, it in turn supplies a positive signal on an output line 511 to an inverter 512. The line 511 in FIG. 18 is connected to And circuits 516 and 519 in FIG. 20 which in turn control the respective sets of gates 513 and 514. If the And circuit 516 in FIG. 20 is operated by the positive signal on the line 511, a set of gates 513 are operated. A positive signal on the line 511 is inverted by the inverter 512 which thereby supplies a negative output signal on a line 517 to an And circuit 524 which in turn supplies a negative signal to an Or circuit 518. If the Or circuit 518 receives negative signals on both inputs, it supplies a negative signal on the output line 174 which deactivates the set of gates 514 in FIG. 20 and a set of gates 515 in FIG. 22. A negative signal on the line 174 also is supplied to the Or circuit 175 in FIG. 10, and it is effective during fetch operations to cause the Or circuit 175 to provide a negative output signal which deactivates the And circuits 170 through 173 in FIGS. 10 through 13. This inhibits the transfer of the real address portion of any one of the associative register to the main store because the requested information is available in the buffer store. If all of the lines 370 through 373 in FIG. 18 are energized with negative signal levels, a negative output signal is supplied from the Or circuit 510 along the line 511 which is effective to decondition the And circuit 516 in FIG. 20 and thereby deactivate the set of gates 513. The negative signal level on the line 511 is inverted by the inverter 512 to a positive signal level on the line 517. This positive signal level on the line 517 is passed by the And circuit 524 in FIG. 20 during fetch operation through the Or circuit 518 to the line 174, and it is effective to operate the sets of gates 514 in FIG. 20, the set of gates 515 in FIG. 22, and the set of gates 824 in FIG. 24, and condition the And circuits 170 through 173 in FIGS. 10 through 13. The positive signal level on the line 517 also is effective to operate the activity list 521 which thereby establishes a positive signal level on one, and only one, of its output lines 291 through 294 thereby to operate one set of the sets of And circuits 251 through 256, 257 through 262, 263 through 268, or 269 through 274 to initiate a replacement operation in a selected sector address register. This causes link information from the encoder 180 in FIG. 12 to be inserted in the selected one of the registers 210 through 213 in FIGS. 14 through 17, and it causes the content of bits 20 and 21 of the address control word in the register 125 of FIG. 10 to be inserted in the associated one of the sector address registers 220 through 223 in FIGS. 14 through 17. The activity list circuit 521 selects the sector address register which was used the longest time ago. The activity list controls the replacement function, and it causes the link register, and the associated sector address, to be selected which identifies the oldest unused information held in the buffer store 12. Whenever the activity list 521 selects one of its output lines, such line is energized with a positive signal, and link information and sector address information is inserted in the appropriate link and sector address registers. The positive signal on the selected one of the lines from the activity list 521 is supplied also to an encoder 522. The encoder 522 generates four binary bits which signify which one of the 16 frames in the buffer store is selected to receive the new information from the main store. Four signals are conveyed from the encoder 522 on a cable 523 to the set of Or circuits 503 in FIG. 20.

The activity list 521 in FIG. 18 receives signals on the line 370 through 373, and these signals inform the activity list of the identity of which sector address register is used whenever a fetch operation is formed. The lines 511 and 517 are connected to the activity list 521. A positive signal on the line 511 causes the activity list to be updated during a fetch operation if the requested information is in the buffer store. A positive signal on the line 517 causes the activity list to perform a replacement operation, and it then supplies a positive signal on that one of the output lines 291 through 294 which inserts in the selected sector address register, and the associated link register, information from the register 125 in FIG. 10 concerning the requested new information. The activity list 521 receives a positive signal on the line 533 from the block valid matrix in FIG. 21, described hereinafter, whenever the selected address of the buffer store holds valid information. The activity list receives a positive signal on the line 792 from the central processing unit during fetch operations which are discussed more fully hereinafter. The activity list in its simpliest form may be a push down stack composed of a trigger matrix which is pushed down each time that a sector address compare is obtained during a fetch operation when the accessed address in the buffer store holds valid information. The push down stack of the activity list places at the top of the push down stack the identity of the sector address register that is being used during a fetch operation to access an address in the buffer store which holds valid information. Each time the identity of a sector address register is placed on top of the push down stack, the remaining registers in the stack are pushed down one position. The identity of a sector address register may appear in only one register of the push down stack. If a given sector address register is accessed a second time, its identity is removed from the push down stack and inserted at the top of the stack. Accordingly, the sector identity located in the bottom register of the push down stack indicates which sector address register is the least active, and it is selected for reassignment when a replacement operation takes place in response to a positive signal on the line 517. The activity list 521 includes an encoder which responds to the signals on the lines 370 through 373, and it supplies the identity of the sector address register being used to the top of the push down stack whenever the lines 511, 533, and 792 are energized with positive signals. The activity list includes a decoder connected to the bottom register of the stack, and the decoder is operated by a positive signal on the line 517 to provide a positive signal on one of its 16 output lines thereby to perform a replacement operation. The replacement operation takes place whenever positive signals are supplied on the lines 517 and 792 and none of the lines 370 through 373 has a positive signal. Circuits which can perform the function of the activity list 521 are known in the art, and further elaboration is not considered essential.

Figure 23:
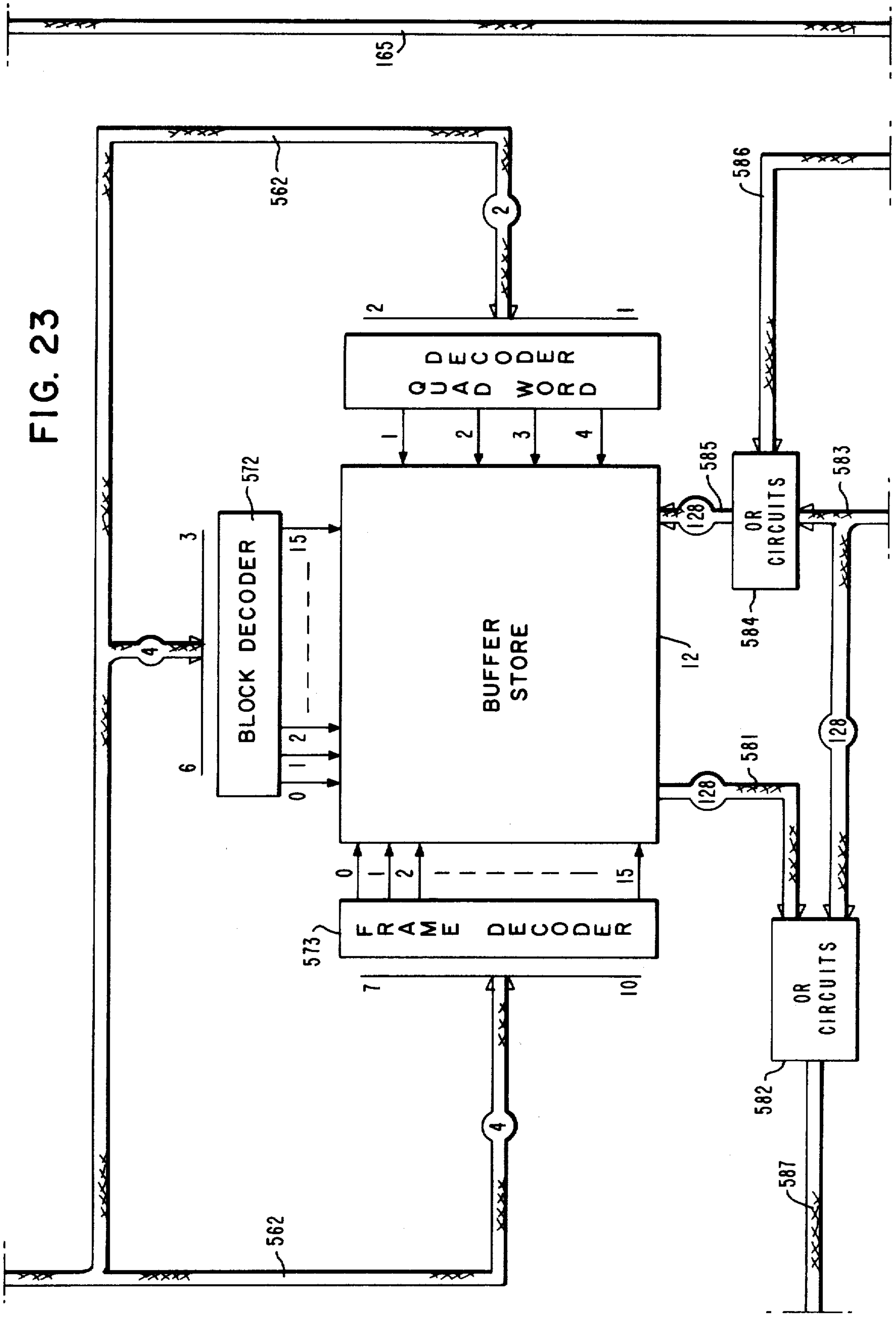

The buffer address register 502 in FIG. 18 supplies address signals to the buffer store 12 in FIG. 23 in some instances, and the duplicate address register 504 in FIG. 20 supplies address signals to the buffer store 12 in FIG. 23 at other times. Bits 22 through 27 of an address control word are supplied from the address control register 125 in FIG. 10 along a cable 530 to the registers 502 and 504. Signals of the cable 530 are supplied through sets of gates 531 and 532 in FIG. 18 to the register 502. The sets of gates 531 and 532 are operated by positive signals on a line 533. Signals of the cable 530 are supplied also through sets of gates 541 and 542 to the register 504. The sets of gates 541 and 542 are operated by positive signals on a line 543. The register 502 in FIG. 18 holds 10 bits. Bits 1 and 2 are employed for quad word selection. Bits 3 through 6 are used for block selection, and bits 7 through 10 are used for frame selection. Bits 22 through 27 of an address control word in the register 125 in FIG. 10 are transferred via the cable 530 and the gates 531 and 532 in FIG. 18 to bit positions 1 through 6 of the register 502. The encoder 500 in FIG. 18 supplies four bits on the cable 501 which are stored in bits 7 through 10 of the register 502. The register 504 in FIG. 20 has the same format as the register 502 in FIG. 18. However, the register 504 in FIG. 20 has a counter 550 which is employed to increment the quad word bits for a store operation. The two quad word bits in the register 504 are supplied on a cable 551 to the counter 550. The two quad word bits are stored in the counter 550 and incremented by the value of one each time a store operation takes place in the buffer store. The incremented value of the counter 550 is supplied through a set of Or circuits 552 to bit positions 1 and 2 of the register 504. Next, the operation of the counter 550 during a store operation in the buffer 12 is described.

When information from main store is transferred to the buffer store 12, the information is transferred a block at a time. As illustrated in FIG. 7 a block includes quad words 1 through 4. When quad word 1 (W1) is supplied to the buffer store, the individual words W1, W2, W3, W4, are supplied and stored in the order listed. However, word W3 is supplied first if it is selected by the address control word in the register 125 in FIG. 10, followed by words W4, W1 and W2. Consequently, the words must be stored in this order in the buffer store 12, and it is the function of the counter 550 in FIG. 20 to maintain the order commencing at any point in the sequence of the quad words W1 through W4. Table 2 below shows the binary setting of the counter 550 for each quad word in a block.

TABLE 2

| Quad Word | Binary Value |
|---|---|
| 1 | 00 |
| 2 | 01 |
| 3 | 10 |
| 4 | 11 |

If a writing operation in the buffer store 12 is to take place commencing with quad word W3, the counter 550 is set to the binary value of 10, and this value is transferred to the bit positions 1 and 2 of the register 504 for the first store operation in the buffer store 12. For the next store operation in the buffer store 12 of the content of the counter 550 is incremented by the quantity of 1 to 11 to store the word W4. When the counter 550 is incremented again, it overflows and returns to the value of 00 for storing the quad word W1. The counter 550 is incremented next to the value of 01 for storing the word W2. Thus it is seen that the counter 550 may be employed to commence with any one of the quad words W1 through W4 and store each one of the quad words in its appropriate buffer store address.

Figure 24:
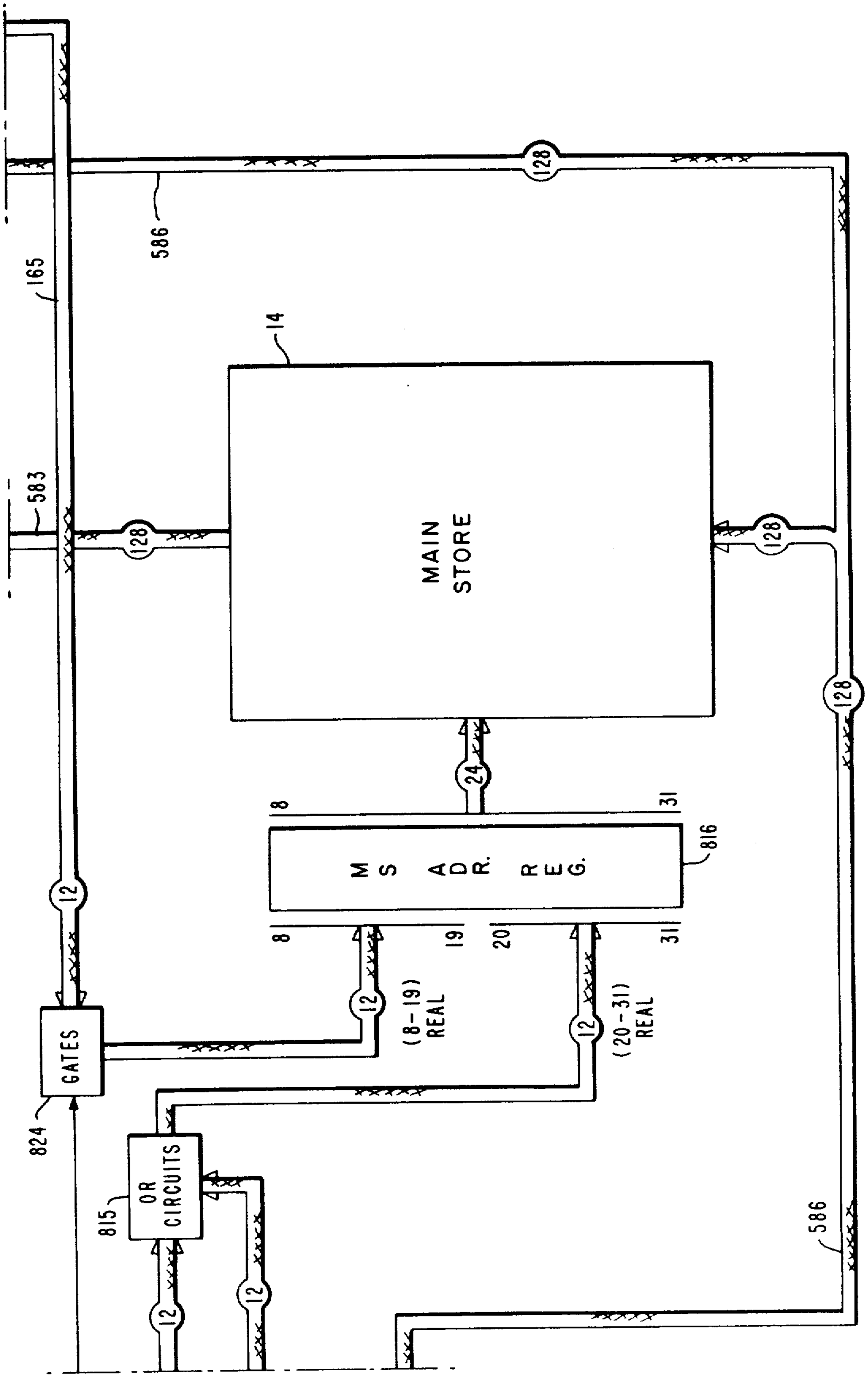

Address information for the buffer store 12 is transferred from the register 502 in FIG. 18 for a read operation from the buffer store through the set of gates 513 to a set of Or circuits 561. Address information for the buffer store 12 is transferred from the register 504 for a store operation in the buffer store through the set of gates 514 to the Or circuits 561. Buffer store address information representing bits 1 through 10 of the registers 502 and 504 is transferred from the Or circuits 561 via a cable 562 to the buffer store 12 in FIG. 23. Bits 1 and 2 are transferred to a quad word decoder 571, and bits 3 through 6 are transferred to a block decoder 572. Bits 7 through 10 are transferred to a frame decoder 573. The frame decoder 573 is operated to select one of the 16 frames shown in FIG. 7. The block decoder 572 is operated to select one of the 16 blocks shown in FIG. 7 of the selected frame. The quad word decoder 571 is operated to select one of the quad words 1 through 4 of the selected block. A selected quad word fetched from the buffer store 12 in FIG. 23 is transferred via a cable 581 to a set of Or circuits 582. Information fetched from the main store 14 in FIG. 24 is supplied via a cable 583 to a set of Or circuits 584 and a set of Or circuits 582. Data from the Or circuits 584 is transferred via a cable 585 to the buffer store 12. The Or circuits 584 also may receive data signals on a cable 586 from the CPU 10 in FIG. 22. This cable serves as a data bus out from the CPU. Data from the Or circuits 582 in FIG. 23 is transferred via a cable 587 to the CPU 10 in FIG. 22. This cable serves as a data bus in to the CPU 10.

Figure 19:
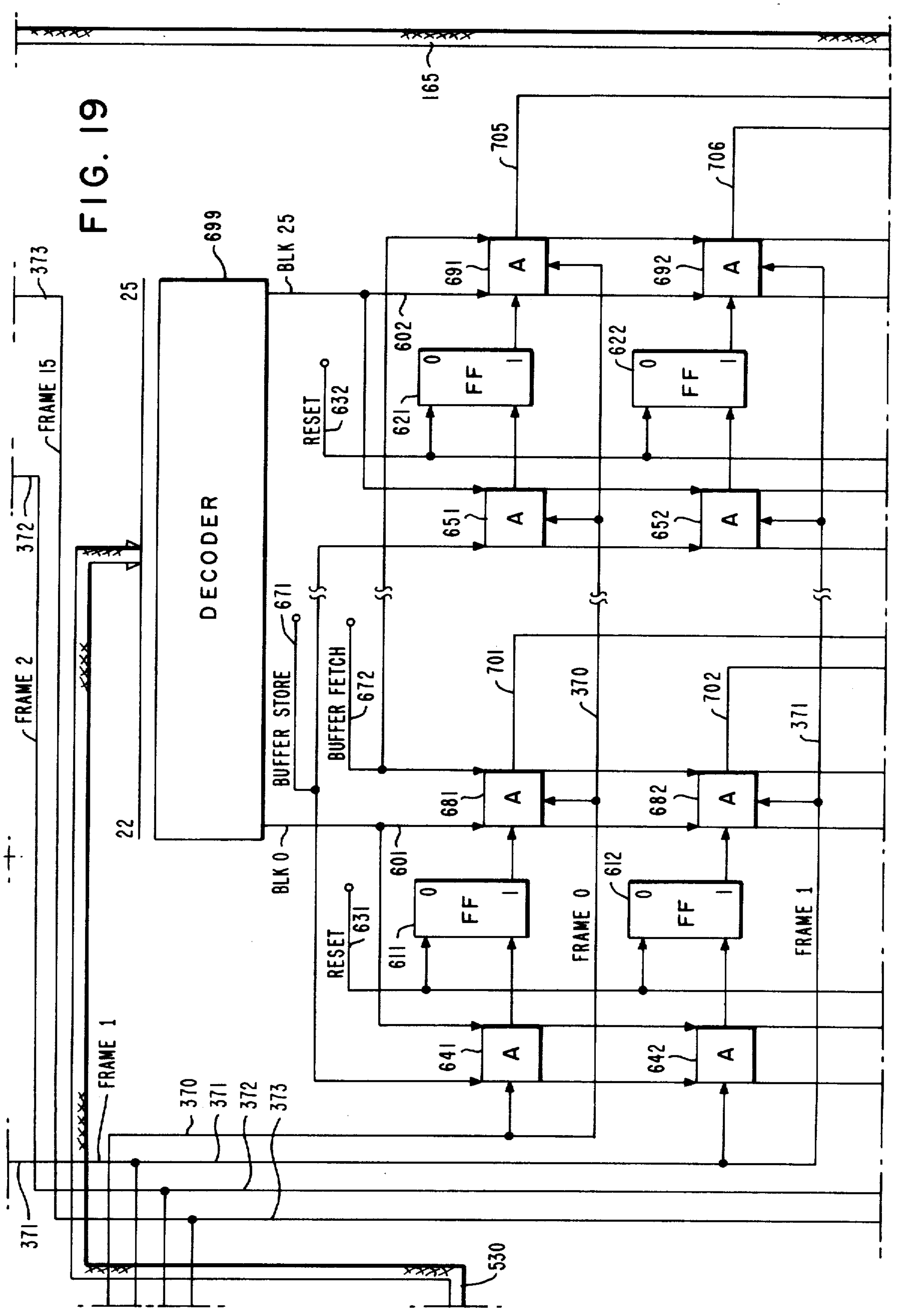
Figure 21:
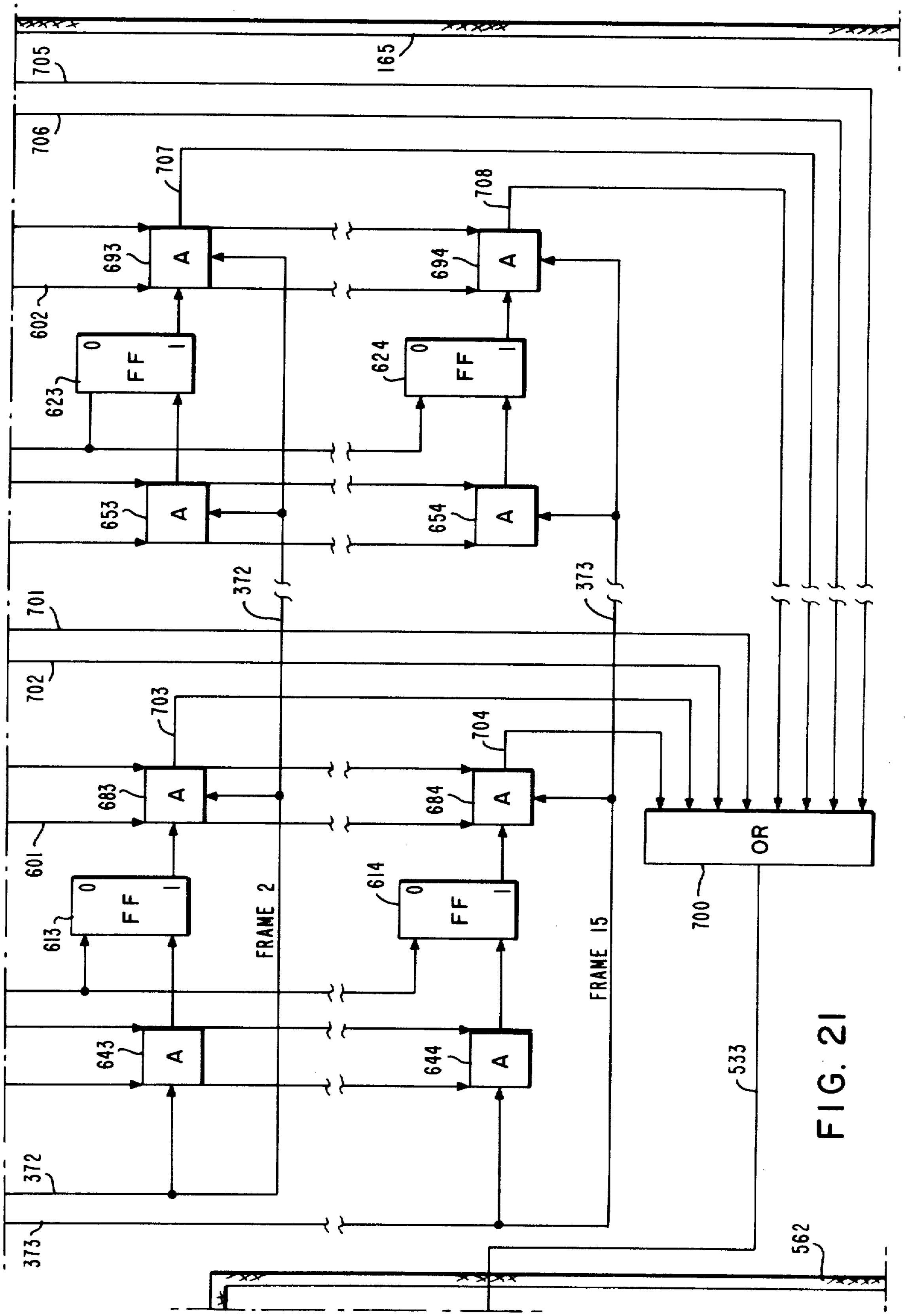

Reference is made next to FIGS. 19 and 21 which illustrate a block valid matrix. The block valid matrix indicates the presence or absence of valid information in each of the blocks of each frame in the buffer store 12 in FIG. 7. The block valid matrix includes 15 vertical lines, one for each of the 15 blocks of a frame in the buffer store, and 15 horizontal lines, one for each of the 15 frames of the buffer store 12 illustrated in FIG. 7. Only two vertical lines 601 and 602 representing respectively blocks 0 and 15 are illustrated in the interest of simplicity. Only horizontal lines 370 through 373, representing respective frames 0,1,2, and 15 likewise are shown in the interest of simplicity. The block valid matrix includes a plurality of flip-flops arranged in columns and rows as shown. Flip-flops 611 through 614 are employed to indicate the status of block 0 for frames 0 through 15. Flip-flops 621 through 624 served to indicate the status of block 15 in each of the frames 0 through 15 of the buffer store 12 in FIG. 7. The flip-flops 611 through 614 are reset by a positive signal on a line 631, and the flip-flops 621 through 624 are reset by a positive signal on a reset line 632.

Connected to the set inputs of the flip-flops 611 through 614 are respective And circuits 641 through 644. Connected to the set inputs of the flip-flops 621 through 624 are respective And circuits 651 through 654. The frame selection lines 370 through 373 are connected to respective And circuits 641 through 644 and to respective And circuits 651 through 654. When a store operation takes place in the buffer store, a positive signal on a line 671 is conveyed to the And circuit 641 through 644 and to the And circuits 651 through 654. If a store operation takes place in block 0 of frame 0 of the buffer store 12, the And circuit 641 in FIG. 19 receives a positive signal on the line 370 and a positive signal on the line 671 and line 601. Consequently, the And circuit 641 supplies a positive output signal which sets the flip-flops 611 to the one state. The flip-flop 611 in turn thereafter supplies a positive output signal from its one output side. This indicates that block 0 of frame 0 holds valid information, and it may be fetched upon request.

The one outputs of the flip-flops 611 through 614 are connected to respective And circuits 681 through 684. The one outputs of the flip-flops 621 through 624 are connected to respective And circuits 691 through 694. The frame selection lines 370 through 373 are connected to respective And circuits 681 through 684 and to respective And circuits 691 through 694. The And circuits 681 through 684 and 691 through 694 are sampled or interrogated during a fetch operation for the purpose of determining if a selected block of a given frame in the buffer store has valid information. This interrogation is performed by a positive signal on a buffer fetch line 672.

Let it be assumed for purposes of illustration that the flip-flops 611 in FIG. 19 is set to the one state during a buffer store operation, and subsequently a fetch request is made to block 0 of frame 0 in the buffer store 12. A positive signal on the frame selection line 370 and a positive signal on the fetch line 672 are supplied to the And circuit 681. The one output side of the flip-flops 611 is a positive signal which is supplied to the And circuit 681. If block 0 is selected, a positive signal on the vertical line 601 is supplied to the And circuit 681. In this case the And circuit 681 responds to positive signals on all of its inputs, and it supplies a positive output signal on the line 701 to an Or circuit 700. The Or circuit 700 in turn supplies a positive signal on its output line 533 which operates the sets of gates 531 and 532 in FIG. 18 thereby to insert the block and quad word selection information into the register 502. It is recalled from the foregoing description that the register 502 is employed for a fetch operation from the buffer store 12 in FIG. 23.

If the flip-flop 611 in FIG. 19 is in the zero state when a fetch operation is made to block 0 of frame 0, then a negative signal is supplied from the one output side of the flip-flop 611 to the And circuit 681. The And circuit 681 in this case then supplied a negative signal on the line 701 to the Or circuit 700 in FIG. 21. The Or circuit 700 then supplies a negative signal on the line 533 to an inverter 710 in FIG. 20. The inverter in turn supplies a positive output signal on a line 543 which operates the sets of gates 541 and 542 to insert block and quad word information into the register 504. It is recalled from the foregoing description that the register 504 is employed to perform a store operation in the buffer store 12 in FIG. 23 whenever requested information is transferred from the main store 14 in FIG. 24 to the CPU 10 in FIG. 22.

It is readily seen from the foregoing illustration that the And circuits 681 through 684 supply positive signals on respective lines 701 through 704 whenever valid information is held in block 0 of the selected frames 1 through 15 during fetch operations. In like fashion the And circuits 691 through 694 supply positive signals on respective lines 705 through 708 whenever they are interrogated during fetch operations and valid information is held by block 15 of selected frames 0 through 15.

A decoder 699 in FIG. 19 responds to block selection signals on the cable 530. The selection signals include bits 22 through 25 of an address control word in the register 125 in FIG. 10. The decoder 699 in FIG. 19 responds to the signals representing bits 22 through 25, and it selects one of the 15 vertical lines representing blocks 0 through 15 of the buffer store and buffer fetch operations.

Next the operation of the block valid matrix is described when a store operation takes place in the buffer store. Initially all flip-flops in the the block valid matrix are reset by positive signals on the lines 631 and 632. Let it be assumed that information is to be stored in block 0 of frame 1. Bits 22 through 25 of the address control word on the cable 530 operate the decoder 699, and it establishes a positive signal on the line 601. A positive signal is supplied on the line 371 when frame 1 of the buffer store is selected. This positive signal is supplied to the And circuit 642 and the And circuit 652. During a buffer store operation a positive signal is supplied on the line 671 to the And circuits 641 through 644 and the And circuits 651 through 654. It is readily seen that the And circuit 642 is the only one which receives positive input signals on all three of its inputs, and it supplies a positive output signal to the set input of the flip-flop 612 thereby setting this flip-flop to the one state. Thereafter the flip-flop 612 continuously supplies a positive signal to the And circuit 682 thereby to indicate that block 0 of frame 1 holds valid information. Thus it is seen how the flip-flops of the block valid matrix are set to indicate where valid information is stored in the buffer store 12.

Figure 22:
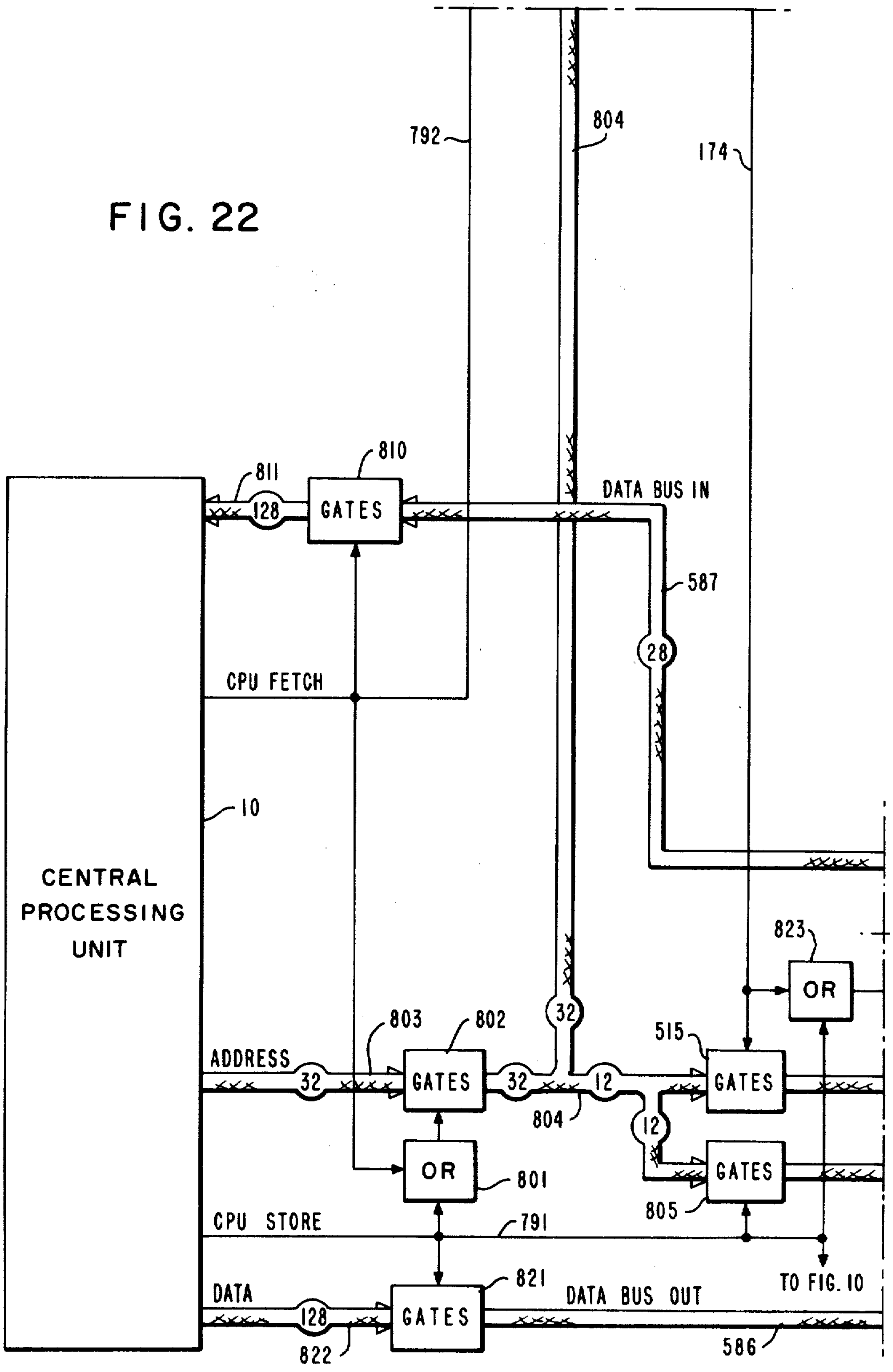

Reference is made next to FIG. 22 for a description of the operation of the central processing unit for fetch and store requests. Store and fetch requests are initiated by the central processing unit. When it initiates fetch request, the central processing unit 10 supplies a positive signal on the CPU fetch line 792. A positive signal on the line 792 passes through an Or circuit 801 and operates a set of gates 802 to transfer address control information from a cable 803 via a cable 804 to a set of gates 805, a set of gates 515, and the address control register 125 in FIG. 10. If the requested information is available in the buffer store 12 in FIG. 23, a negative signal is supplied on the line 174 to the set of gates 515 in FIG. 22 which inhibits the operation of this set of gates. In this case the buffer store 12 in FIG. 23 supplies the requested information via the cable 581, the Or circuits 582, the cable 587, a set of gates 810. The positive signal on the line 792 operates the set of gates 810 to pass information on the cable 587 via a cable 811 to the central processing unit. In the event a CPU fetch request is initiated and the requested information is not available in the buffer store 12, the line 174 in FIG. 22 then supplies a positive signal to the set of gates 515. Real address bits 20 through 31 of the address control word are transferred from the cable 804 through the set of gates 515 and a set of Or circuits 815 to a main store address register 816. A positive signal on the line 174 is applied also through the Or circuit 175 in FIG. 10 on the line 174a to the And circuits 170 through 173 in respective FIGS. 10 through 13. One of the compare circuits 120 through 123 in respective FIGS. 10 through 13 provides a positive output signal because the virtual address in the register 125 compares with the virtual address stored in one of the registers 100 through 103 in respective FIGS. 10 through 13. Consequently, a positive signal on one of the lines 130 through 133 conditions one of the associated And circuits 170 through 173 in FIGS. 10 through 13, and one of the sets of gates 150 through 153 is operated to supply the real address portion from the associated one of the registers 100 through 103 along the associated one of the cables 160 through 163 through the set of Or circuits 164 along the cable 165 to the set of gates 824 in FIG. 24. The positive signal on the line 174 passes through the Or circuit 823 in FIG. 22 to operate the set of gates 824 in FIG. 24 thereby to transfer the real address information from the cable 165 to the main store address register 816. The main store address register 816 in FIG. 24 then holds real address information bits 8 through 31, and they are employed to obtain the requested information from the main store 14. When the requested information is made available by the main store 14, it is transferred via the cable 583, the set of Or circuits 582 in FIG. 23, the cable 587, the set of gates 810 in FIG. 22, and the cable 811 to the central processing unit 10. The information from the main store 14 is supplied also via the cable 583 in FIG. 24 through the Or circuits 584 in FIG. 23 along the cable 585 to the buffer store 12 where this information is stored at locations determined by the content of the register 504 in FIG. 20.

Whenever the central processing unit 10 in FIG. 22 initiates a CPU store request, it supplies a positive signal on a line 791. A positive signal on the line 791 passes through the Or circuit 801 to operate the set of gates 802 thereby to transfer address information on the cable 803 via the cable 804 to the set of gates 805, the set of gates 515, and the control register 125 in FIG. 10. The positive signal on the line 791 in FIG. 22 operates the set of gates 805 to transfer the main store real address bits 20 through 31 directly through the Or circuits 815 to the main store address register 816. The positive signal on the line 791 also operates a set of gates 821 in FIG. 22 to pass data signals on a cable 822 via a cable 586 to the main store 14 in FIG. 24 and via a set of Or circuits 584 in FIG. 23 to the buffer store 12. During a CPU store operation data from the central processing unit is always stored in the main store 14 in FIG. 24, and this data may be stored also in the buffer store 12 in FIG. 23, if, and only if, the specified address in the buffer store holds valid information as indicated by the block valid matrix in FIGS. 19 and 21. Thus data from the central processing unit is stored in the buffer store only as an updating operation of valid data held in the buffer store. The positive signal on the line 791 in FIG. 22 passes through the Or circuit 823 to operate the set of gates 824 in FIG. 24 thereby to transfer real address bits 8 through 19, obtained as explained above, from the cable 165 to the main store address register 816. The positive signal on the line 791 in FIG. 22 during a CPU store is supplied to the Or circuit 175 in FIG. 10 to transfer the real address bits from the selected register in the associative array as explained above. It is pointed out that whenever a store or fetch operation takes place, it accesses the main store simultaneously as it accesses the buffer store. Each store operation initiated by the central processing unit 10 in FIG. 22 takes place in the main store 14, and it takes place simultaneously in the buffer store 12 if the specified address in the buffer store holds valid information. Each fetch operation initiated by the central processing unit 10 in FIG. 22 accesses the buffer store 12 and the main store 14 simultaneously. The requested information is obtained promptly from the high speed buffer store 12 if it is available, and the main store is not accessed because real address bits 8 through 19 are not supplied to the main store address register 816. Otherwise the requested information is obtained from the relatively slower speed main store 14 after a longer delay. Since the main store 14 is accessed simultaneously as the buffer store 12 is accessed, the main store 14 supplies the requested data at the end of its normal cycle, and no time is lost by the main store 14 as a result of the unsuccessful attempt to obtain the requested data from the buffer store 12. It is appropriate at this point to discuss in greater detail the events which take place throughout the system of FIGS. 10 through 24 whenever the central processing unit initiates fetch and store requests.

First, a fetch operation is described. Whenever the central processing unit 10 in FIG. 22 initiates a CPU fetch, it supplies a positive signal on the line 792 which passes through the Or circuit 801 to operate the set of gates 802 and thereby transfer address control information from the central processing unit 10 via the cable 803, the set of gates 802, and the cable 804 to the address control register 125 in FIG. 10. The bits 0 through 31 of the address control word which are stored in the register 125. The virtual address bits 8 through 19 of the address control word in the register 125 are conveyed on the cable 126 to the compare circuits 120 through 123 in respective FIGS. 10 through 13. The virtual address portions of the registers 100 through 103 in respective FIGS. 10 through 13, constituting the associative array 22 in FIG. 1, are conveyed to the respective compare circuits 120 through 123 via associated cables 110 through 113 in respective FIGS. 10 through 13. It is assumed, as pointed out earlier, that all virtual addresses supplied in address control words from the CPU 10 to the register 125 in FIG. 10 have been translated so that the corresponding main store real address portion is stored adjacent the virtual address portion in the registers 100 through 103. Consequently, the virtual address bits 8 through 19 of the register 125 will compare with virtual address bits 8 through 19 of one of the associative registers 100 through 103. One of the compare circuits 120 through 123 therefore finds a comparison and establishes a positive signal on the associated one of the output lines 130 through 133 in respective FIGS. 10 through 13.

The sector address in the main store is stored in bits 20 and 21 of the address control word in the register 125 in FIG. 10, and these bits are compared with the main store sector address bits stored in the sector address registers 220 through 223 in respective FIGS. 14 through 17. The compare operation takes place in the compare circuits 340 through 343 in respective FIGS. 14 through 17, and the result of the comparison is indicated by signals on the respective output lines 350 through 353. A positive output signal on one or more of these lines indicates that a sector comparison is found, and a negative signal on the remaining ones of these lines indicates the absence of a sector comparison. There are several possible cases, namely, case (1) where no sector comparison is found by any one of the compare circuits 340 through 343 or case (2) where a sector comparison is found by one or more of the compare circuits 340 through 343. For case (1) above no comparison is found, and this indicates that the desired sector in the main store 14 is not available in the buffer store 12. Consequently, it is necessary to access the main store, forward the requested data to the CPU 10, and store it in the buffer store 12. The requested word and the remaining words in the same block of the main store are sent to and stored in the buffer store. Next the sequence of events is described for accomplishing the data transfers resulting from case (1) above. This case arises when a new address control word has been translated and stored in the associative registers 100 through 103 in FIGS. 10 through 13, but the requested data has not yet been transferred from the main store to the buffer store.

When case (1) occurs, it causes negative signals to be applied on all of the lines 350 through 353 in respective FIGS. 14 through 17 to respective And circuits 360 through 363 in FIGS. 14 through 17. Therefore, each of these And circuits provides a negative output signal on associated lines 370 through 373 to the Or circuit 510 in FIG. 18, the activity list 521, the encoder 500, and the block valid matrix in FIGS. 19 and 21. The negative signals on the line 370 through 373 in FIGS. 19 and 21 deactivate or decondition each of the And circuits 681 through 684 and 691 through 694 whereby the associated output lines 701 through 704 and 705 through 708 supply negative signals to the Or circuit 700 in FIG. 21. The Or circuit in turn supplies a negative signal to the inverter 710 in FIG. 20 which in turn supplies a positive signal on the line 543 to condition the sets of gates 541 and 542 thereby to transfer bits 22 through 27 of the address control word in the register 125 in FIG. 10 to the duplicate buffer address register 504 in FIG. 20. The positive signal on the line 543 also conditions one input to the And circuit 519.

The negative signals on the lines 370 through 373 cause the Or circuit 510 in FIG. 18 to provide a negative output signal on the line 511. The negative output signal on the line 511 deconditions the And circuits 516 and 519 in FIG. 20. Deconditioning the And circuit 516 inhibits the operation of the set of gates 513. The negative signal on the line 511 in FIG. 18 is supplied to the inverter 512 which thereby supplies a positive signal on the output line 517 to the And circuit 524 which is conditioned by a positive signal on the line 792 during a CPU fetch to pass a positive output signal to the Or circuit 518. The positive signal on the output line 174 from the Or circuit 518 operates the set of gates 514, and the positive signal on the line 174 operates the set of gates in FIG. 22 thereby to transfer the main store real address bits 20 through 31 of the address control word from the cable 804 through the Or circuits 815 in FIG. 24 to the main store address register 816. The positive signal on the line 174 also passes through the Or circuit 823 in FIG. 22, and the positive output signal from this Or circuit operates the set of gates 824 in FIG. 24 to pass the real address bits 8 through 19 from the selected one of the associative registers in FIGS. 10 through 13 to the main store address register 816 in FIG. 24. The positive signal on the line 174 in FIG. 20 is supplied through the Or circuit 175 in FIG. 10 to gate the real address bits 8 through 19 to the cable 165 as previously explained. The content of the main store address register 816 then is used to fetch the selected information from the main store 14.

The positive signal on the line 517 in FIG. 18 operates the activity list 521 to perform a replacement or reassignment operation by providing a positive signal on a selected one of its 16 output lines thereby to select one of the registers ARL–0 through ARL–15 in FIGS. 14 through 17 and its associated sector address register. The activity list 521 selects the particular one of the sector address registers which has not been used to access the buffer for the longest time period. That is, the sector-link register combination selected is the one which has its identity at the bottom of the push down stack described earlier. Let it be assumed for purposes of illustration that the activity list 521 selects register ARL–0 and SECAR–0. Then the activity list 521 supplies a positive signal on the output line 291 which conditions the And circuits 251 through 256. Further let it be assumed for purposes of illustration that the virtual address in bits 8 through 19 of the register 125 in FIG. 10 compare with the virtual address portion of the register 101 in FIG. 11. The compare circuit 121 therefore provides a positive signal on its output line 131. The positive signal on the line 131 is applied to the encoder 180 in FIG. 12 which in turn provides a combination of binary signals (0001) on its output lines 181 through 184 which identify the register 101 in FIG. 11. These signals are passed by the And circuits 251 through 254 in FIG. 14 and stored in the link register 210 (ARL–0). The signals stored in the register 210 are then conveyed on the lines 310 through 313 to the decoder 300 which is then operated to select one of its 16 output lines. The particular output line selected is energized with a positive signal, and this line identifies the register 101 in FIG. 11. The particular line selected is the line 317 in FIG. 14, and it identifies the register 101 in FIG. 11. It is energized with a positive signal. This illustrates clearly how the link register 210 (ARL–0) links the sector address register 220 (SECAR–0) to the associative register 101(AR–1). Since, under the assumed conditions, the lines 131 is energized with a positive signal, it follows that the And circuit 321 in FIG. 14 receives positive signals on both of its input lines 317 and 131. The And circuit 321 thus supplies a positive output signal to the Or circuit 324 which in turn supplies a positive output signal to the And circuit 360. The sector address bits 20 and 21 in the register 125 of FIG. 10 are supplied on the lines 280 and 281 through respective And circuits 256 and 255 to the sector address register 220. The sector address bits thus stored in this register then are supplied on the lines 326 and 327 to the compare circuit 340. These same bits are supplied on the lines 280 and 281 to the compare circuit 340. A comparison must be reached, and the compare circuit 340 supplies a positive signal on its output line 350 to the And circuit 360. Since the And circuit 360 receives positive signals on both of its inputs, it supplies a positive signal on its output line 370 to the encoder 500 in FIG. 18. The encoder 500 in FIG. 18 responds to a positive signal on the line 370, which is associated with frame 0 of the buffer store 12, to provide an output code (0000) which identifies frame 0 of the buffer store 12. This binary code is supplied on the cable 501 to the frame portion of the registers 502 and 504 in FIG. 20. The frame selection signals of the cable 501 in FIG. 18 are supplied through a set of Or circuits 503 in FIG. 20 to the frame portion of the duplicate buffer address register 504. The block selection bits 22 through 25 are transferred via the cable 530 to the gates 542, and the positive signal on the line 543 operates this set of gates to transfer these bits to the block selection portion of the register 504. The quad word selection bits 26 and 27 are supplied on the cable 530 to the set of gates 541 in FIG. 20, and the positive signal on the line 543 operates this set of gates to transfer the quad word selection bits through the Or circuit 552 to the register 504.

The positive signal on the line 370 in FIG. 18, in addition to being applied to the encoder 500 for buffer frame selection, is supplied also to the Or circuit 510. The output of the Or circuit 510 consequently changes from a negative signal level to a positive signal level, and this positive signal is supplied to the And circuits 516 and 519 in FIG. 20. It is recalled that the signal level on the line 533 from the Or circuit 700 in FIG. 21 is a negative signal, and this signal level continues to inhibit the operation of the And circuit 516 in FIG. 20 thereby to prevent operation of the set of gates 513 until store operations in the buffer store 12 are completed. A positive signal is not applied to the buffer store line 671 in FIG. 19 until the buffer store operations are completed. The positive signal level on the line 511 in FIG. 18 operates the inverter 512 to supply a negative signal on its output line 517 to the And circuit 524 which in turn supplies a negative signal level to the Or circuit 518 in FIG. 20. However, the And circuit 519 in FIG. 20 receives a positive signal level on the line 543 and a positive signal level on the line 792, and it thereby supplies a positive output signal to the Or circuits 518 simultaneously as the signal level on the line 511 changes from a negative signal (for a no compare condition) to a positive signal (for a compare condition). Consequently, the output signal from the Or circuit 518 on the line 174 continues as a positive signal.

A positive signal on the line 174 is supplied through the Or circuit 175 in FIG. 10 on the line 174*a* to the And circuits 170 through 173 in respective FIGS. 10 through 13. The And circuit 171 in FIG. 11 is conditioned by a positive signal from the compare circuit 121, and it supplies a positive output signal to the set of gates 151 thereby to transfer the real address portion from the associative register 101 (AR–1) along the associated cable 161 to the set of Or circuits 164. Signals from the set of Or circuits 164 are supplied along the cable 165 to the set of gates 824 in FIG. 24. The positive signal on the line 174 also passes through the Or circuit 823 to operate the set of gates 824 in FIG. 24 and thereby transfer the real address bits 8 through 19 to the main store address register 816. The positive signal on the line 174 is applied to the set of gates 514 in FIG. 20 to transfer the content of the duplicate buffer address register 504 via the cable 562 to the buffer store decoders 571 through 573 in FIG. 23 which perform respectively quad word selection, block selection, and frame selection in the buffer store 12. When the selected quad word from the main store 14 in FIG. 24 is presented on the cable 583, it is supplied through the set of Or circuits 582 in FIG. 23, along the cable 587, through the set of gates 810 in FIG. 24 and on the cable 811 to the central processing unit 10. It is pointed out that the CPU fetch signal on the line 792 is positive at this time, and it conditions the set of gates 810. Also, the selected quad word from the main store 14 in FIG. 24 is supplied on the cable 583 through the Or circuits 584 in FIG. 23 to the buffer store 12 where it is stored in the buffer store at the address determined by the duplicate buffer address register 504 in FIG. 20. The counter 550 in FIG. 20 is incremented by the quantity of 1, and the next quad word is read from the main store 14 in FIG. 24 and stored in the buffer store 12 in FIG. 23 at the address indicated by the duplicate buffer address register 504. This process is repeated until all four quad words of the selected block in the main store 14 have been transferred and stored in the buffer store 12. After each quad word is stored in the buffer store 12, the counter 550 in FIG. 20 is advanced, and this insures that the quad words of a block are stored in the correct order regardless of which one of the quad words is supplied first during a block transfer from the main store 14 in FIG. 24 to the buffer store 12 in FIG. 23. When a block of data, as shown in FIG. 6, has been transferred to and stored in the buffer store 12 in FIG. 23, the line 671 in FIGS. 19 and 21 is energized with a positive signal, and this permits the appropriate flip-flop in the block valid matrix to be set. In this case the positive signal on the line 370 conditions one input to the And circuits 641 and 651 in FIG. 19. The positive signal on the buffer store line 671 conditions a second input to the And circuits 641 and 651. Let it be assumed that the preceding store operations took place in block 0 of frame 0. Then the block decoder 699 supplies a positive signal on the line 601 to the And circuit 641. Thus all inputs to the And circuit 641 are positive, and the output signal from the And circuit 641 is a positive signal which sets the flip-flop 611 to the one state. Thereafter, the one output side of the flip-flop 611 conditions one input to the And circuit 681, and subsequent fetch operations to block 0 of frame 0 may take place. It is seen, therefore, how a fetch operation takes place in the main store whenever the requested data is not available in the buffer store, and how a block of data in the main store is transferred to the buffer store. This completes the description for case (1) above.

Next the events which take place for case (2) above are discussed. For case (2) one or more of the compare circuits 340 through 343 find a comparison during a fetch operation. It is pointed out that one, and only one, of the lines 130 through 133 is energized with a positive signal. Each one of the lines 130 through 133 is associated with one of the registers AR–0 through AR–15. It is essential that one, and only one, of the sector address comparisons found by one or more of the compare circuits 340 through 343 be linked by the associated one of the link registers 210 through 213 to a particular one of the registers AR–0 through AR–15. If this occurs, it signifies that a selected sector address is located in a selected page. If the sector addresses and page addresses are not related, then case (1) results, and the sequence of events described above with reference to case (1) are repeated. Case (2) occurs if, and only if, a sector and page are related, and this relationship is described next.

Let it be assumed for purposes of illustrating case (2) that the compare circuit 120 in FIG. 10 finds a comparison between bits 8 through 19 of the virtual address portion in the register 125 and the virtual address portion stored in the associative register 100. This causes a positive signal to be established on the output line 130. Let it be assumed further that the register 211 in FIG. 15 stores a four bit code (0000) which points to or links to the associative register 100 in FIG. 10. The four bits in the register 211 in FIG. 15 are supplied as signals on the lines 401 through 404 to the decoder 301, and it selects one of its 16 output lines. In this case it selects the output line associated with the associative register 100 in FIG. 10. Thus a positive signal is established on the line 405 to the And circuit 409. The positive signal on the line 130 is supplied also to the And circuit 409. The And circuit 409 in turn supplies a positive output signal to the Or circuit 413 which in turn supplies a positive signal to the And circuit 361.

Let it be assumed next that the sector bits 20 and 21 of the register 125 in FIG. 10 are identical to the sector bits stored in the sector address register 221 in (SECAR–1) in FIG. 15. As a result the compare circuit 341 finds a comparison and supplies a positive signal on its output line 351 to the And circuit 361. Since the And circuit 361 receives positive signals on both of its inputs, it supplies a positive output signal on the line 371. A positive signal on the line 371 indicates that frame 1 of the buffer store 12 in FIG. 23 is selected. The positive signal on the line 371 in FIG. 15 is supplied to the encoder 500 in FIG. 18. The encoder 500 supplies four bits of information on the cable 501, and these four bits identify frame 1 of the buffer store 12. The four bits on the cable 501 are supplied to the register 502 and through the set of Or circuits 503 to the register 504. The positive signal on the line 371 in FIG. 15 is supplied also to the Or circuit 510 in FIG. 18. The Or circuit 510 in turn supplies a positive output signal on the line 511 to the And circuits 516 and 519 in FIG. 20. The positive signal on the line 511 is supplied also to the inverter 512 in FIG. 18 which in turn supplies a negative signal on the line 517 to the activity list 521. The negative signal on the line 517 inhibits the initiation of a replacement operation by the activity list 521. The negative signal on the line 517 is supplied also to the And circuit 524 in FIG. 20 which in turn supplies a negative signal to the Or circuit 518.

Let it be assumed for purposes of illustration that the requested information is located in the buffer store 12 in block 0 of frame 1. It follows then that the flip-flop 612 in FIG. 19 was set to the one state whenever such information was inserted earlier in block 0 of frame 1 in the buffer store 12. As a result the one output from the flip-flop 612 supplies a positive signal to the And circuit 682. The positive signal on the line 371 from the And circuit 361 in FIG. 15 is supplied also to the And circuit 682 in FIG. 19. Since block 0 is selected, bits 22 through 25 of the register 125 in FIG. 10 are supplied on the cable 530 to the decoder 699 in FIG. 19, and the decoder 699 indicates that block 0 is selected by supplying a positive signal on the vertical lines 601. The positive signal on the vertical lines 601 is supplied to the And circuit 682. A positive signal is supplied to the line 672 during a fetch operation to sample and determine if the selected block holds valid information. In this case a positive signal on the line 672 is passed by the And circuit 682 on the line 702 to the Or circuit 700 in FIG. 21. The Or circuit 700 in turn supplies a positive signal on the output line 533 to operate a set of gates 531 and 532. By operating these sets of gates 531 and 532 bits 22 through 27 of the register 125 in FIG. 10 are transferred via the cable 530 to the buffer address register 502. The positive signal on the line 533 is supplied to the And circuit 516 in FIG. 20. It is recalled that this And circuit receives a positive signal on the line 511. Therefore, the And circuit 516 supplies a positive output signal to the set of gates 513, and the content of the buffer address register 502 is transferred through a set of Or circuits 561 via the cable 562 to the decoders 571 through 573 in FIG. 23 thereby to obtain the information requested by the fetch operation of the central processing system. When the requested information is obtained from the buffer store 12 in FIG. 23, it is supplied on the cable 581, through the set of Or circuits 582, along the cable 587 to the set of gates 810 in FIG. 22. A positive CPU fetch signal on the line 792 operates the set of gates 810 to transfer the information on the cable 587 via the cable 811 to the central processing unit 10.

The positive signal on the line 533 in FIG. 21 is supplied also to the inverter 710 in FIG. 20 which in turn supplies a negative signal on the line 543 which inhibits the operation of the sets of gates 541 and 542. The negative signal on the line 543 also inhibits the operation of the And circuit 519. Consequently both inputs to the Or circuit 518 are negative signals, and the Or circuit in turn supplies a negative output signal on the line 174 to the set of gates 514 in FIG. 22 which inhibits the operation of this set of gates. During a fetch operation by the central processing unit the line 791 in FIG. 22 is energized with a negative signal, and this inhibits the operation of the set of gates 805. Consequently, bits 20 through 31 of an address control word cannot be transferred from the central processing unit 10 to the main store address register 816 in FIG. 24 via the set of gates 805. The negative signal on the line 791 is supplied to the Or circuit 823. The negative signal on the line 174 in FIG. 22 is supplied also to the Or circuit 823 in FIG. 22. Thus the Or circuit 823 receives negative signals on both inputs and supplies a negative output signal which inhibits the operation of the set of gates 824 in FIG. 24. This prevents the transfer of bits 8 through 19 of an address control word from the central processing unit 10 to the main store address register 816. Therefore, whenever the buffer store 12 is accessed during a fetch operation address control information cannot be supplied to the main store address register 816 in FIG. 24, and the main store 14 thereby is inhibited from operating and providing requested information whenever the buffer store 12 holds the requested information. It is seen therefore how the main store is inhibited from operating when requested data is obtained more expeditiously from the buffer store.

Since the buffer store is accessed, the activity list 521 in FIG. 18 must be updated. The positive signals on the lines 371, 533, and 792 cause the activity list to place the identity the sector address of register 221 at the top of the pushdown stack because it was used for this access.

It was assumed above in discussing case (2) that block 0 of frame 1 held valid information, and this was indicated by flip-flop 612 in FIG. 19 being in the one state. Let it be assumed for purposes of illustration that the contrary is true, that is, block 0 of frame 1 does not hold valid information. In this event the flip-flop 612 is in the zero state, and the one output of the flip-flop 612 supplies a negative signal to the And circuit 682. Let the remaining assumptions for case (2) stand as discussed above. Consequently, the positive signal on the line 371 in FIG. 15 passes through the Or circuit 510 in FIG. 18, and it is applied to the And circuits 516 and 519. The positive signal on the line 371 is applied to the encoder 500 which in turn supplies the identity of frame one of the buffer store 12 to the registers 502 and 504 via the cable 501. The positive signal on the line 371 is applied to the And circuit 682 in FIG. 19. The block selection bits 22 through 25 of the register 125 in FIG. 10 are supplied via the cable 530 to the decoder 699 in FIG. 19. The decoder 699 selects block 0 by supplying a positive signal on the vertical output line 601 to the And circuit 682. The line 672 in FIG. 19 is energized with a positive signal for a buffer fetch operation, and this positive signal is applied to the And circuit 682. However, the input from the one output side of the flip-flop 612 is a negative signal, and the And circuit 682 in turn supplies a negative output signal on the line 702 to the Or circuit 700 in FIG. 21. The Or circuit 700 in turn supplies a negative output signal on the line 533 which inhibits the operation of the gates 531 and 532 in FIG. 18. The negative signal on the line 533 also inhibits the operation of the And circuit 516 in FIG. 20, and it inhibits the activity list from performing an updating operation. That is, the identity of the sector address register 221 is not placed in the top of the push down stack. The negative signal on the line 533 is inverted to a positive signal by the inverter 710, and the inverter 710 supplies a positive signal on the line 543 which operates the sets of gates 541 and 542 thereby to transfer bits 22 through 27 from the cable 530 to the duplicate buffer address register 504. The positive signal on the line 543 is supplied to the And circuit 519. A positive signal is supplied on the line 792 to the And circuit 519. Since all input signals to the And circuit 519 are positive, this And circuit supplies a positive output signal through the Or circuit 518 to operate the set of gates 514 and thereby transfer the content of the register 504 to the decoders 571 through 573 in FIG. 23. The positive signal on the line 174 in FIG. 20 operates the set of gates 515 in FIG. 22 to transfer bits 24 through 31 of the address control word from the central processing unit to the main store address register 816 in FIG. 24. The positive signal on the line 174 passes also through the Or circuit 823 to the set of gates 824 in FIG. 24. The gates 824 transfer the real address portion of the selected register 101 (AR-1) in the associative array, bits 8 through 19, to the main store address register 816. That is, positive signal on the line 174 is supplied through the Or circuit 175 in FIG. 10 to the And circuits 170 through 173 in FIGS. 10 through 13. One, and only one, of the compare circuits 120 through 123 supplies a positive signal to a respective one of the And circuits 170 through 173 in FIGS. 10 through 13. The selected one of the And circuits is the And circuit 171 which receives a positive signal on the line 131 and passes a positive signal which operates the associated sets of gates 151 in FIG. 11 thereby to transfer the real address portion of the register 101 (AR-1) via the cable 161 to the Or circuits 164 in FIG. 13. The real address portion of the selected associative register is transferred then via the cable 165 through the set of gates 824 in FIG. 24 to the main store address register 816. Thus the main store address register is filled with real address bits 8 through 31. When the selected information is obtained from the main store 14 in FIG. 24, it is transferred via the cable 583, through the Or circuits 582 in FIG. 23 along the bus 587, to the set of gates 810 in FIG. 22. During a fetch by the central processing unit a positive signal on the line 792 operates the set of gates 810 thereby to transfer the information on the bus 587 along the cable 811 to the central processing unit 10. Information from the main store 14 on the cable 583 is supplied also through the Or circuits 584 in FIG. 23 to the buffer store 12 where it is stored in the frame, block, and quad word location specified by the duplicate buffer address register 504 in FIG. 20. All four quad words in the selected block of the main store 14 are transferred to and stored in the buffer store 12 under control of the register 504 and the counter 550 as explained previously.

When the four quad words have been fetched from the main store 14 and stored in block 0 of frame 1 of the buffer store 12, the line 671 in FIG. 19 is energized with a positive signal. The positive signal on the line 671 is supplied to the And circuit 642. The positive signal on the line 371 is supplied to the And circuit 642. Therefore, the And circuit 642 supplies a positive output signal which sets the flip-flop 612 to the one state, and the one output of the flip-flop 612 supplies a positive signal thereafter to the And circuit 682. Any subsequent request by the central processing unit 10 in FIG. 22 for information stored in this particular block, sector, and page of the virtual store maybe accessed directly from the buffer store 12 in FIG. 23. Once a block of data is accessed in the main store for the first time and the entire block is transferred and stored in the buffer store 12, any subsequent fetch request from the central processing unit for data in the same block and frame is obtained directly from the buffer store 12. Thus it is seen from the foregoing discussion of case (2) that requested information is taken directly from the buffer store 12 when it is available there. Otherwise, the requested information is obtained from the main store, and the accessed block is transferred in its entirety and stored in the buffer store 12 in FIG. 23.

It is appropriate next to discuss CPU store operations. Whenever a CPU store operation takes place, a positive signal is established on the line 791 in FIG. 22. The positive signal on the line 791 operates the set of gates 821 thereby to transfer data from the central processing unit 10 via the cable 822, the gates 821, and the cable 586 to the main store 14 in FIG. 24. The positive signal on the line 791 passes through the Or circuit 801 in FIG. 22 and operates the set of gates 802, and the positive signal on the line 791 operates the set of gates 805. Consequently, address signals from the central processing unit 10 are transferred via the cable 803, the set of gates 802, to the cable 804. Bits 0 through 31 of the address control word are transferred via the cable 804 to the register 125 in FIG. 10. Bits 20 through 31 of the address control word on the cable 804 are transferred via the set of gates 805 in FIG. 22 through the Or circuits 815 in FIG. 24 to the main store address register 816. The positive signal on the line 791 in FIG. 22 passes through the Or circuit 823 and operates the set of gates 824 in FIG. 24 to transfer real address bits 8 through 19 on the cable 165 to the main store address register 816. The real address bits on the cable 165 are obtained from a selected register in the associative array. The positive signal on the line 791 is supplied to the Or circuit 175 in FIG. 10. The Or circuit 175 in turn supplies a positive signal on the output line 174*a* to the And circuits 170 through 173 in FIGS. 10 through 13. The virtual address bits 8 through 19 of the register 125 in FIG. 10 are supplied via the cable 126 to the compare circuits 120 through 123. The virtual address portions of the associative registers 100 through 103 are supplied to respective compare circuits 120 through 123. Since it is assumed for purposes of this discussion that data address translation has taken place, each of the associative registers 100 through 103 has real address bits stored in the right hand portions thereof. Consequently one, and only one, of the compare circuits 120 through 123 provides a positive output signal. The compare circuits 120 through 123 are connected by corresponding lines 130 through 133 to the respective And circuits 170 through 173. Since the line 174a is energized with a positive signal, one of the And circuits 170 through 173 is operated to provide a positive output signal to the associated one of the sets of gates 150 through 153. Consequently, the real address bits 8 through 19 from one of the registers 100 through 103 is conveyed on an associated one of the cables 160 through 163 to the Or circuits 164 in FIG. 13. Signals from the Or circuits 164 are conveyed on the cable 165 through the set of gates 824 in FIG. 24 to the main store address register 816.

A store operation takes place in the main store 14 in FIG. 24. The data supplied on the cable 586 from the central processing unit 10 is stored in the main store 14 at an address specified by the main store real address bits 8 through 31 which are stored in the main store address register 816.

From the foregoing description it is readily seen that whenever a store operation takes place that data supplied by the central processing unit is stored in the main store in each case. The same data may or may not be stored in the buffer store. This depends on whether or not the buffer store 12 in FIG. 23 holds valid data in the address specified by the address control word from the central processing unit. If so, the new data is written into the specified address of the buffer store thereby to replace the old data with the new or updated data. In essence data is written in the buffer store only as an updating operation. If the address control word in a store specifies an address in the buffer store 12 which is not a valid address, then the data from the central processing unit 10 is written in the main store 14 only and not in the buffer store 12. There is good reason for this. Information is written in the buffer store 12, it is recalled, a complete block at a time, and the block valid matrix indicates the entire block is valid. A transfer of information less than a complete block to the buffer store 12 would result (1) in not being able to access such information subsequently if the associated trigger is not set in the block valid matrix of FIGS. 19 and 21 or (2) if the appropriate trigger of the block valid matrix in FIGS. 19 and 21 is set when less than a complete block is transferred to the buffer store 12, the indication is erronous. That is, when a block valid trigger is set to the one state, it indicates that the entire block is valid, and a transfer of less than a block means that the remaining portion of such block is invalid. Thus it is seen that updating of any word stored in the buffer store 12 is permitted during a store operation by the central processing unit, but the transfer of new information to invalid addresses of the buffer store 12 is not permitted.

In order to illustrate an updating operation in the buffer store 12, let it be assumed that the CPU 10 issues a store instruction. A positive signal is established on the line 791 which operates the set of gates 821 to transfer data from the central processing unit via the cable 822, the gates 821, and the cable 586 to the main store 14 in FIG. 24. The data on the cable 586 is supplied also through the Or circuits 584 in FIG. 23 to the buffer store 12. The positive signal on the line 791 in FIG. 22 passes through the Or circuit 801 to operate the set of gates 802, and the positive signal on this line also operates the set of gates 805. Therefore, bits 20 through 31 of the address control word is transferred from the central processing unit via the cable 803, the set of gates 802, the cable 804, the set of gates 805, and the set of Or circuits 815 in FIG. 24 to the main store address register 816. The positive signal on the line 791 in FIG. 22 passes through the Or circuit 823 to operate the set of gates 824 in FIG. 24. The positive signal on the line 791 in FIG. 22 is supplied also to the Or circuit 175 in FIG. 10. The Or circuit 175 in turn supplies a positive output signal on the line 174a to condition the And circuits 170 through 173. The address control word is transferred from the central processing unit via the cable 803, the set of gates 802, and the cable 804 to the register 125 in FIG. 10. The register 125 in FIG. 10 stores bits 0 through 31, and the virtual address portion in bits 8 through 19 is supplied on the cables 126 to the compare circuits 120 through 123 in respective FIGS. 10 through 13. The virtual addresses stored in the registers 100 to 102 of the associative array are supplied to respective compare circuits 120 through 123. Since data address translation previously has been performed, as assumed earlier, one of the compare circuits 120 through 123, and only one, provides a positive output signal to an associated one of the And circuits 170 through 173. Let it be assumed for purposes of illustration that in this case the compare circuit 123 in FIG. 13 finds a comparison between its two inputs and supplies a positive output signal on the line 133. This positive signal is supplied to the And circuit 173 which operates the set of gates 153 to supply the main store real address bits 8 through 19 via the cable 163, the Or circuits 164 and the cable 165 to the set of gates 824 in FIG. 24. It is recalled earlier that the positive signal on the line 791 passes through the Or circuit 823 in FIG. 22 to operate the set of gates 824 in FIG. 24 thereby to transfer the real address bits 8 through 19 on the cable 165 to the main store address register 816. Consequently, the main store address register 816 is filled with bits 8 through 31 which specify a selected address in the main store 14 where the data on the cable 586 is to be stored. The main store 14 is accessed, and the data on the cable 586 is stored at the selected address indicated by the main store address register 816. As the main store is accessed for the purpose of storing data therein, a simultaneous effort is made to store the same data in the buffer store 12 in FIG. 23. Let it be assumed for purposes of illustration that the sector address in bits 20 and 21 of the register 125 in FIG. 10 is identical to the sector address stored in the register 222 in FIG. 16. Consequently, the sector address signals on the lines 280 and 281 are identical to the sector address signals supplied by the register 222 on the lines 447 and 446 to the compare circuit 342. Since the two inputs to the compare circuit 342 are identical, it supplies a positive output signal on the line 352 to the And circuit 362 in FIG. 16. Let it be assumed that the link register 212 in FIG. 16 is linked to the associative register 103 (AR–15) in FIG. 13. The combination of signals on the lines 430 through 433 from the register 212 in FIG. 16 to the decoder 302 identify the register 103 (AR–15) in FIG. 13. Consequently the decoder 302 provides a positive signal on the output line 337 to the And circuit 444. The number in parentheses by each of the And circuits 441 through 444 signifies which one of the registers AR–0 through AR–15 is selected by the decoder 302. The And circuit 444 responds to the positive signal on its input line 437 and the positive signal on its input line 133 from the compare circuit 123 in FIG. 13, and this And circuit supplies a positive output signal through the Or circuit 445 to the And circuit 362. The And circuit 362 responds to the two positive input signals supplied thereto, and it supplies a positive output signal on the line 372. The positive signal on the line 372 indicates that frame 2 the buffer store 12 is selected. The positive signal on the line 372 is supplied to the block valid matrix in FIGS. 19 and 21. Let it be assumed that the block selection signals in bits 22 through 25 of the register 125 in FIG. 10. specify block 0. The block signals in the bits 22 through 25 are supplied via the cable 530 in FIG. 10 to the decoder 699 in FIG. 19. The decoder 699 responds to the block selection signals and supplies a positive output signal on the vertical line 601 of the block valid matrix. A positive signal on the line 601 indicates that block 0 is selected. Let it be assumed further that the flip-flop 613 in FIG. 21 is set in the one state. Therefore its one output is a positive signal which is supplied to the And circuit 683 in FIG. 21. The positive signal on the line 372 is supplied also to the And circuit 683. The positive signal on the line 601 is supplied to the And circuit 683. A positive sense signal on the line 672 is supplied to the And circuit 683. Since the And circuit 683 has positive signals on all of its inputs, it supplies a positive output signal on the line 703 to the Or circuit 700 in FIG. 21. The Or circuit 700 in turn supplies a positive output signal on the line 533 to the sets of gates 531 and 532 in FIG. 18 thereby to gate the block selection bits 22 through 25 and the quad word selection bits 26 and 27 from the cable 530 to the buffer address register 502 in FIG. 18. The positive signal on the line 533 is supplied also to the And circuit 516 in FIG. 20. The positive signal on the line 533 is inverted by the inverter 710 in FIG. 20, and it supplies a negative output signal which inhibits the operation of the sets of gates 541 and 542. The negative signal on the line 543 also inhibits the operation of the And circuit 519 in FIG. 20.

The positive signal on the line 372 in FIG. 18 is supplied also to the encoder 500. The encoder 500 responds to a positive signal on the line 372 and provides a combination of output signals on the cable 501 which select frame 2 of the buffer store 12 in FIG. 23. The frame selection signals on the cable 501 in FIG. 18 are stored in the buffer address registers 502 and 504. Thus the buffer register 502 is loaded with bits 1 through 10 which specify the frame, block, and quad word to be addressed in the buffer store 12. The positive signal on the line 372 in FIG. 18 is supplied to the Or circuit 510 which in turn supplies a positive output signal on the line 511 to the And circuits 516 and 519 in FIG. 20. The And circuit 519 is inhibited by a negative signal on the line 543 as pointed out earlier. The And circuit 516 responds to the positive signal on the line 511 and the positive signal on the line 533, and it supplies a positive signal to the set of gates 513. Consequently the address signals in the buffer address register 502 are transferred via the gates 513, the Or circuits 561, and the cable 562 to the decoders 571 through 573 in FIG. 23. The buffer store 12 is operated to address the frame, block, and quad word specified by the buffer address register 502, and the data supplied to the buffer store 12 from the central processing unit is stored in this address. Consequently the valid data previously stored at this address is updated by the new information substituted therein. The updating operation takes place in the main store simultaneously because the same information is used to update the corresponding location in the main store 14.

While the invention has been particularly shown and described with reference to a preferred embodiment thereof, it will be understood by those skilled in the art that various changes in form and details may be made therein without departing from the spirit and scope of the invention.

What is claimed is:

1. A data processing system including:
   - a central processing unit which provides address signals that represent virtual addresses,
   - a main store coupled to said central processing unit, said main store storing a plurality of blocks of data,
   - a buffer store coupled to said central processing unit and said main store, said buffer store storing a plurality of blocks of data which correspond to a submultiple of said blocks of data stored in said main store,
   - an associative storage device coupled to said central processing unit, said associative storage device storing virtual address signals and corresponding real address signals for said main store,
   - first means coupled to said associative storage device for comparing virtual address signals provided by said central processing unit with said virtual address signals stored in said associative storage device for producing a first signal which indicates whether or not a successful comparison is made,
   - second means connected to said first means which responds to said first signal and transfers to said main store real address signals associated with given virtual address signals whenever such virtual address signals compare with said virtual address signals from said central processing unit, and
   - third means coupled to said first means, said central processing unit and said buffer store which responds to virtual address signals from said central processing unit and said first signal to provide a second signal to said buffer store for accessing an address in said buffer store which corresponds to the address specified by said virtual address signals from said central processing unit.

2. The apparatus of claim 1 which includes fourth means to inhibit operation of said second means when access is made to said buffer store during a fetch operation by said central processing unit.

3. A data processing system which uses virtual addresses to transfer data selectively between units within said system, said data processing system comprising:
   - a central processing unit which supplies virtual address signals representing data,
   - a main store coupled to said central processing unit, said main store storing a plurality of blocks of data,
   - a buffer store coupled to said central processing unit and said main store, said buffer store storing a plurality of blocks of data corresponding to a portion of said plurality of blocks of data stored in said main store,
   - an associative storage device coupled to said central processing unit, said associative storage device storing virtual address signals and corresponding real address signals for said main store, first means coupled to said associative storage device and said central processing unit for comparing virtual address signals from said central processing unit with the virtual address signal in said associative storage device for producing a first signal which indicates whether or not a successful comparison is made, second means connected to said first means, said associative storage device, and said main store which responds to said first signal and transfers to said main store real address signals associated with given virtual address signals whenever such given virtual address signals compare with virtual address signals from said central processing unit, third means coupled to said first means and said central processing unit which responds to virtual address signals from the central processing unit and said first signal from said second means to produce a second signal, said buffer store including fourth means responsive to said first signal, said second signal, and virtual address signals from said central processing unit for accessing said buffer store at an address corresponding to said virtual address signals from said central processing unit, and fifth means which inhibits operation of said second means whenever access is made to said buffer store during a fetch operation by said central processing unit.

4. A data processing system including a central processing unit, a buffer store, and a main store, said central processing unit being coupled to said buffer store and said main store, a first register, means connecting said central processing unit to said first register, said central processing unit supplying address control words having a virtual address portion and a real address portion to said first register, said first register including a virtual address portion and a real address portion for storing the respective virtual address portions and the real address portion of each address control word, an associative array including a plurality of registers each having a virtual address portion and a real address portion, comparing means responsive to the virtual address portion of said first register and the virtual address portion of each register in said associative array for identifying any register in said associative array having a virtual address equal to the virtual address stored in said first register, transfer means coupled to said associative array for transferring to said main store the real address portion of any register in said associative array which has its virtual address portion equal to the virtual address of said first register whenever the requested information is not available in said buffer store during a fetch operation, a plurality of sector address registers, a plurality of link registers, said plurality of sector address registers and said plurality of link registers being arranged in pairs whereby a given sector address register is associated with a given link register, first means to insert information in any link register which identifies any one of said registers in said associative array whereby any sector address register may be linked to any register of said associative array, and second means responsive to said comparing means, said sector address register, and said link registers which accesses said buffer store to fetch or store information at a location specified by the address control word in said first register.

5. The apparatus of claim 4 wherein said first means includes a device for selecting that link register which has been used the least during the recent time period whenever a change is made in the content of any link register.

6. The apparatus of claim 4 wherein said second means includes third means which inhibits access to the selected address in said buffer store unless such address holds valid information.

7. A data processing system including a central processing unit, a buffer store, and a main store, said central processing unit being connected to said buffer store and said main store, an address control register, means connecting said central processing unit to said address control register for supplying address control words to said address control register, said address control register including a virtual address portion and a real address portion, an associative array including a plurality of registers each having a virtual address portion and a real address portion, said associative array further including means responsive to the virtual address portion of said address control register and the virtual address portion of each register in said associative array for identifying which register in said associative array has a virtual address equal to the virtual address stored in said address control register, transfer means coupled to said associative array for transferring to said main store the real address portion of any register in said associative array which has its virtual address portion equal to the virtual address of said address control register during all store operations and during fetch operations whenever the requested information is not available in said buffer store, a plurality of sector address register, a plurality of link registers, said plurality of sector address registers and said plurality of link registers being arranged in pairs whereby each sector address register is associated with a given link register, first means connected to said link registers for inserting information in any link register which identifies any one of said registers in said associative array whereby any sector address register may be linked to any register of said associative array, and second means responsive to said identifying means, said sector address register, and said link registers which accesses said buffer store to fetch or store information at a location specified by said address control register.

8. The apparatus of claim 7 wherein said first means includes a device for selecting that link register which has been used the least over the recent time period whenever a change is made in the content of any link register.

9. The apparatus of claim 7 wherein said second means includes a matrix which inhibits access of the selected address in said buffer store unless it holds valid information.

10. A data processing system including a central processing unit, a main store, and a buffer store, said data processing unit being coupled to said main store and said buffer store whereby information may be exchanged with said main store and said buffer store, the central processing unit utilizing address control words to access said main store and said buffer store, the address control words each having a virtual address portion and a real address portion, an associative array having a plurality of registers with each register having a virtual address portion and a real address portion, first means responsive to the virtual address portion of each address control word and the virtual address portion of each register in said associative array which determines a given register in said associative array which has a virtual address portion identical to the virtual address portion of an address control word from said central processing unit, second means for transferring the real address portion of said given register in said associative array to said main store for the purpose of accessing said main store during store operations and during fetch operations whenever requested information is not available in said buffer store, and third means including a plurality of link registers and a plurality of sector address registers responsive to said first means and the real address portion of an address control word from said central processing unit for accessing a selected location in said buffer store whenever said buffer store holds valid information in such address.

11. The apparatus of claim 10 wherein said first means includes a plurality of compare circuits each having an output, means connecting the virtual address portion of each associative register as one input to the associated compare circuit, and means connecting the virtual address portion of each address control word from said central processing unit as a second input to all of the compare circuits, said plurality of sector address registers and said plurality of link registers being arranged in pairs whereby a given sector address register is associated with a given link register, fourth means coupled to said link registers for inserting information in any link register which identifies any one of the registers in said associative array whereby any sector address register may be linked to any one of the registers in said associative array, and fifth means responsive to the outputs of said compare circuits, said sector address registers, and said link registers which accesses the buffer store to fetch or store information at a location specified by an address control word from said central processing unit.

12. The apparatus of claim 10 wherein said fifth means includes a matrix which inhibits access of the selected address in said buffer store unless such address holds valid information.

13. The apparatus of claim 10 wherein said address control word having one portion thereof designated as a sector address and including a plurality of decoders, one for each link register, means connecting each link register to its associated decoder, a plurality of second compare circuits, one for each of said sector address registers, each of said second compare circuits having two inputs and an output, each sector address register being connected as one input to its associated one of said second compare circuits, means connecting said sector address portion of said address control word to the second input of all of said second compare circuits, and means responsive to the outputs of said first compare circuits, the outputs of said second compare circuits, the outputs of said plurality of decoders, and real address portion of said address control word for accessing the location of said buffer store specified by said address control word.

14. A data processing system including a central processing unit, a main store, and a buffer store, said data processing unit being coupled to said main store and said buffer store, said central processing unit utilizing address control words to access said main store and said buffer store, the address control words each having a virtual address portion and a real address portion, an address control register, means connecting said central processing unit to said address control register, said central processing unit supplying address control words to said address control register, an associative array having a plurality of registers with each register having a virtual address portion and a real address portion, a plurality of first compare circuits, one for each register in said associative array, each one of said compare circuits having two inputs and an output, means connecting the virtual address portion of each register in said associative array to one input of its associated compare circuit, means connecting the virtual address portion of said address control register to the second input of all of said compare circuits, said compare circuits serving to determine a given register in said associative array which has a virtual address portion identical to the virtual address portion of said address control register, transfer control means responsive to the output of said compare circuits for transferring the real address portion of said given register in said associative array to said main store for the purpose of accessing said main store whenever an access cannot be made to said buffer store at the address specified by the address control word in said address control register, a plurality of sector address registers, a plurality of link registers, said sector address registers and said link registers being arranged in pairs whereby a given sector address register is permanently associated with a given link register, a plurality of second compare circuits, one for each of said sector address registers, each of said second compare circuits having two inputs and an output, each sector address register being connected as one input to an associated one of said second compare circuits, said address control register having one portion thereof designated as a sector address, means connecting said sector address portion of said address control register as a second input to all of said second compare circuits, a plurality of decoders, one for each link register, means connecting each link register to an associated decoder, each decoder having a plurality of output lines, a plurality of first And circuits, one for each output line of said decoders, means connecting each output line of said decoders to an associated one of said And circuits, means connecting the outputs of said plurality of first compare circuits to selected ones of said plurality of first And circuits, a plurality of Or circuits, one associated with each of said decoders, means connecting said And circuits of each decoder to the Or circuit associated with such decoder, each Or circuit having an output, a plurality of second And circuits, one associated with each of said Or circuits, means connecting the output of each Or circuit to an associated one of said plurality of second And circuits, means connecting the output of each one of said second compare circuits to a different one of said second And circuits, means responsive to the outputs of said plurality of second And circuits and the real address portion of said address control register for accessing the location of said buffer store specified by the control word in said address control register.

15. The apparatus of claim 14 which further includes means for inserting in a selected link register information which identifies said given register in said associative array whenever all of the second And circuits do not operate.

16. The apparatus of claim 14 which further includes means to inhibit access to the selected address in said buffer store unless such address holds valid information.

17. The apparatus of claim 14 further including an encoder, the outputs of said second And circuits being connected to said encoder, means responsive to said encoder and the real address portion of said address control register for accessing the location of said buffer store specified by the control word in said address control register.

18. The apparatus of claim 14 further including a matrix, the outputs of said second And circuits being connected to said matrix and the block portion of said address control register being connected to said matrix, said matrix providing an output which inhibits operation of said accessing means thereby to prevent access to said buffer store whenever the selected address does not hold valid information.

19. The apparatus of claim 17 further including:

an activity list circuit, means coupling the outputs of said second And circuits to said activity list circuit, a second encoder, the outputs of said first compare circuits being connected to said second encoder, second gating means disposed between said second encoder and each one of said link registers, and third gating means disposed between the sector address portion of said address control register and each one of said sector address registers, said activity list circuit being connected to said second and third gating means to selectively operate said second and third gating means to insert the identity of the given register in said associative array into a selected link register and simultaneously to insert the sector address portion of said address control register in said second address register associated with said selected link register.

20. Apparatus for controlling the transfer of data in a virtual storage system comprising:

a data handling device, a main store coupled to said data handling device, said main store storing a plurality of blocks of data, each block consisting of groups of data with each group being a sub-multiple of said blocks, a buffer store coupled to said data handling device and said main store, said buffer store including addressing means for storing group addresses and data storage means for storing data, the group addresses in said addressing means corresponding to groups of data in said main store, said data handling device providing an address signal having a virtual portion designating the virtual location of a block of data in said main store and a real portion designated a group of data within said block and a data word location within said group, means for storing virtual block address signals and associated real block address signals, means for comparing the virtual block address signal provided by said data handling device with the virtual block address signals stored in said storing means and providing a first signal indicating a successful comparison, means associated with the group addresses in said addressing means for providing second signals indicating the group addresses in said addressing means which correspond to the virtual block addresses in said storing means, means for comparing said first signal with said second signals and providing a third signal indicating a group address that corresponds to the virtual block address of said storing means which compared with the virtual block address provided by said data handling device, means for comparing the real portion of said address signal designating a group of data with the group addresses in said addressing means and providing a fourth signal indicating a successful comparison, means enabled by said third and fourth signals for providing a group address signal designating the location of a group of data in said buffer store, and means responsive to said group address signal and to the real portion of said address signal designating a data word location for accessing said buffer store.

* * * * *